(12) United States Patent
Mizuno et al.

(10) Patent No.: US 6,555,928 B1
(45) Date of Patent: Apr. 29, 2003

(54) POWER SOURCE CONTROL METHOD FOR AN ELECTRIC VEHICLE

(75) Inventors: Yutaka Mizuno, Iwata (JP); Masahisa Kuranishi, Iwata (JP); Mikio Saitou, Iwata (JP); Toshiaki Yamada, Iwata (JP)

(73) Assignee: Yamaha Hatsudoki Kabushiki Kaisha (JP)

( * ) Notice: Subject to any disclaimer, the term of this patent is extended or adjusted under 35 U.S.C. 154(b) by 0 days.

(21) Appl. No.: 09/666,778

(22) Filed: Sep. 21, 2000

(30) Foreign Application Priority Data

Sep. 21, 1999 (JP) .......................................... 11-267319

(51) Int. Cl.$^7$ .................................................. H02J 7/00
(52) U.S. Cl. .................................... 290/40 C; 180/65.5
(58) Field of Search .......................... 290/40 C; 322/14, 322/15, 16; 180/60, 65.5

(56) References Cited

U.S. PATENT DOCUMENTS

| | | | |
|---|---|---|---|
| 4,962,462 A | * 10/1990 | Fekete | 180/65.8 |
| 5,631,532 A | * 5/1997 | Azuma et al. | 320/102 |
| 5,656,921 A | * 8/1997 | Farrall | 180/65.2 |
| 6,175,217 B1 | * 1/2001 | Da Ponte et al. | 322/19 |

\* cited by examiner

*Primary Examiner*—Nicholas Ponomarenko
(74) *Attorney, Agent, or Firm*—Knobbe, Martens, Olson & Bear, LLP

(57) ABSTRACT

An electric vehicle comprises a first power source and a second power source. The first power source can be used to supply a substantially constant base power level and the second power source can be used to supply a variable power level such that a variable load demand can be filled by combining the base power level and the variable power level. The first source can be used to supply power to the second source when the second source is operating at a decreased charge or power level. The base power level can be varied based upon the remaining charge or power level contained within the second source. A number of control methods for operating the power supply of the electric vehicle are disclosed.

29 Claims, 12 Drawing Sheets

POWER SOURCE CONTROL METHOD FOR AN ELECTRIC VEHICLE

RELATED APPLICATIONS

The present application is based on and claims priority to Japanese Patent Application No. 11-267319, filed Sep. 21, 1999, which is hereby expressly incorporated by reference.

BACKGROUND OF THE INVENTION

1. Field of the Invention

The present invention generally relates to power source control methods for electric vehicles. More particularly, the present invention relates to power source control methods for hybrid-driven vehicles having fuel cells and secondary batteries.

2. Related Art

Electric vehicles, such as hybrid type electric vehicles, have been developed to reduce pollution output from vehicles. The hybrid vehicles generally feature an electric motor that propels the vehicle and two types of energy supply. One of the two types of energy supply can be a battery, such as a lead battery, that is capable of charging and that is capable of supplying electric power to the electric motor in quick response to load changes. The other of the two types of energy supply can be a fuel cell that is adapted to use easily-supplied fuel and that has low pollution output.

It should be mentioned that at least two types of fuel cells have been developed for these hybrid vehicles. One type of fuel cell uses hydrogen gas that is held in a hydrogen gas reservoir as fuel. The other type of fuel cell uses hydrogen gas that is generated in a reformer, such as by combusting methanol, methane or butane, which serves as the primary fuel.

In hybrid vehicles, especially in smaller vehicles such as motorized bicycles, load variation (i.e., the required load due to manipulation of an accelerator or due to changes in the external load resulting from changes in slope or other irregularities in the road) at the motor is substantial. Accordingly, quick response to fluctuations in load is desired.

The large load variation and the desire for quick response presents a dilemma. The fuel cells, if using pure hydrogen in the hydrogen reservoir, suffer from delayed response due to inertia of the hydrogen gas flow (i.e., pulses in the short-time variation of the hydrogen gas flow). The pure hydrogen fuel cells also suffer from unstable output. The fuel cells, if using reformed hydrogen, cannot increase the output of the electric motor immediately following starting or after other sudden load increases because of poor response within the reformer. Thus, the desired quick response power characteristics fail to be achieved consistently.

Accordingly, at the time of sudden load increase, increased electric power has been supplied by a hybrid system with a battery to cope with the delayed response of the fuel cell. This battery supplied power increase must be sustained until the fuel cell power output rises to the challenge. During this period of time, the load on the battery can exceed a threshold level and the battery charge can fall abruptly. The abrupt decrease in battery charge can result in decreased travel distance or shorter battery life.

SUMMARY OF THE INVENTION

In view of the foregoing, one aspect of the present invention provides a power source control method for a hybrid vehicle. The method preferably is capable of coping with load change by making proper use of two disparate power sources according to the operating characteristics of each. By accounting for the operating characteristics of the battery and the fuel cell, more stable operation of the vehicle results. In addition, the method advantageously reduces capacity shortening and deterioration of the battery.

Another aspect of the present invention involves a power source control method for a hybrid-driven mobile body comprising a motor type power system for travelling, a fuel cell and a battery as power sources. The power sources supply electric power in response to loads on the power system, wherein to a varying load, electric power corresponding to a base load portion at a given level and with a substantially small variation is supplied from the fuel cell and electric power corresponding to a varying load portion is supplied from the battery.

According to this arrangement, the fuel cell constantly bears a load of a given level as a base load portion, and the battery bears a varying load portion exceeding the base load portion. Therefore, electric power is supplied from the fuel cell which is substantially constant or varies slowly according to the operating mode, while electric power is supplied from the battery for the varying load portion that exceeds the base load portion, thereby decreasing burden of the battery, reducing abrupt capacity drop or deterioration of the battery, and providing more stable running by distributing the whole load more efficiently between the fuel cell and the battery.

In a preferred arrangement, the base load portion is increased when the capacity of the battery is smaller than a specified value, and the base load portion is decreased when the capacity is larger than a specified value.

According to this arrangement, the remaining capacity of the battery is metered. If the remaining capacity is smaller than a specified value, the base load portion is raised to increase power supply by the fuel cell beyond the actual load to charge the battery. If the remaining capacity is larger than a specified value, the base load portion is lowered to decrease power supply by the fuel cell and to increase the battery load share so as to discharge the battery. One result of this aspect is that the capacity of the battery is maintained in a proper condition.

In another preferred arrangement, electric power is supplied continuously from the fuel cell after the vehicle is stopped. According to this arrangement, power generation by the fuel cell continues when the vehicle temporarily stops running. The power generated during this period charges the battery.

One aspect of the present invention involves a method for controlling an electric vehicle having a first power source and a second power source. The method comprises sensing a load level, calculating a base load, supplying the base load from the first power source and supplying a remainder of the sensed load level from the second power source.

Another aspect of the present invention involves an electric vehicle comprising a frame with at least one driven wheel rotatably connected to the frame. A motor unit is supported by the frame and is drivingly connected to the at least one driven wheel. A control unit is adapted to communicate with the motor unit. Power is supplied to the motor unit from a first power source and a second power source. The control unit is adapted to calculate a base load that is supplied by the first power source. The control unit is adapted to sense a varying load demand and to compensate for differences between the base load and the varying load with power supplied by the second power source.

BRIEF DESCRIPTION OF THE DRAWINGS

These and other features, aspects and advantages of the present invention will now be described with reference to the drawings of several preferred embodiments, which embodiments are intended to illustrate and not to limit the invention, and in which figures.

DETAILED DESCRIPTION OF THE PREFERRED EMBODIMENTS OF THE INVENTION

Figure 1:
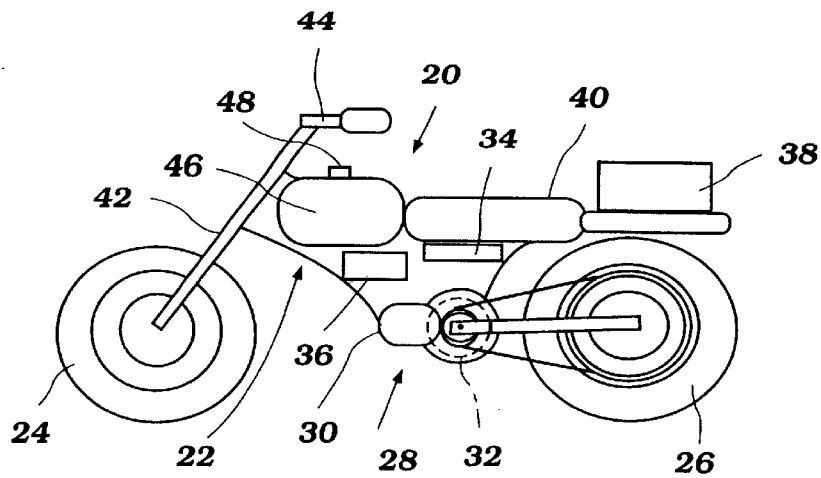
FIG. 1 is a side elevation view of a hybrid vehicle featuring a control method having certain features, aspects and advantages of the present invention.
Figure 2A:
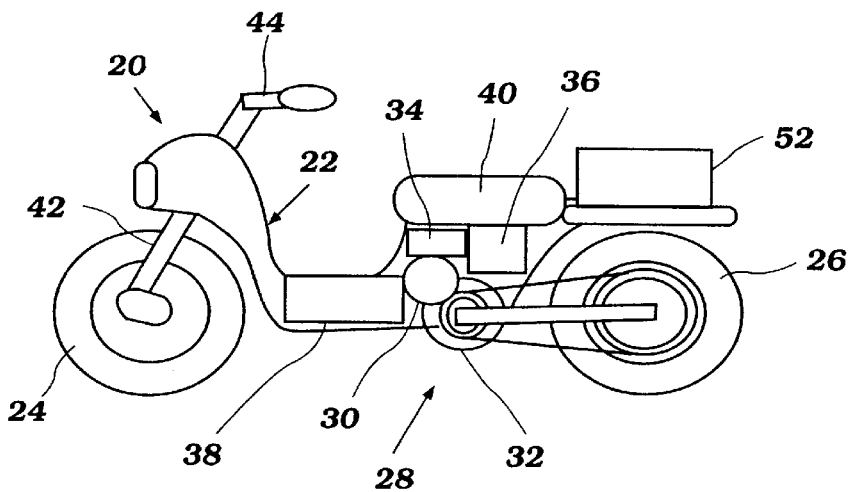
FIG. 2(A) is a side elevation view of another hybrid vehicle also featuring a control method having certain features, aspects and advantages of the present invention.

With reference now to FIGS. 1 and 2(A), two exemplary hybrid-driven vehicles are illustrated therein. The vehicles are indicated by the reference numeral 20. While the present invention will be described in the context of a motorized bicycle or scooter, the present invention has utility in a number of other applications. For instance, the present invention can find utility in applications as diverse as watercraft, three and four wheel vehicles and tracked vehicles. In addition, some features of the present invention may find utility in vehicles that are meant to fly or that are meant to be suspended upon a cushion of air. Of course, other applications will become apparent to those of ordinary skill in the relevant arts. In addition, while the illustrated arrangements will feature a fuel cell and a battery that form two power supply sources, it is anticipated that certain features, aspects and advantages of the present invention can be used in vehicles featuring two fuel cells, two batteries, a generator or a capacitor.

With reference now to FIG. 1, the illustrated vehicle 20 generally comprises a frame assembly 22 that supports a number of components associated with the vehicle 20. The frame assembly 22 preferably is of the welded-up variety but can be of any suitable construction. The frame assembly 22 is supported by a front wheel 24 and a rear wheel 26 in the illustrated arrangement. Of course, the frame assembly 22 can be carried by any number of wheels or in any other suitable manner.

Figure 3:
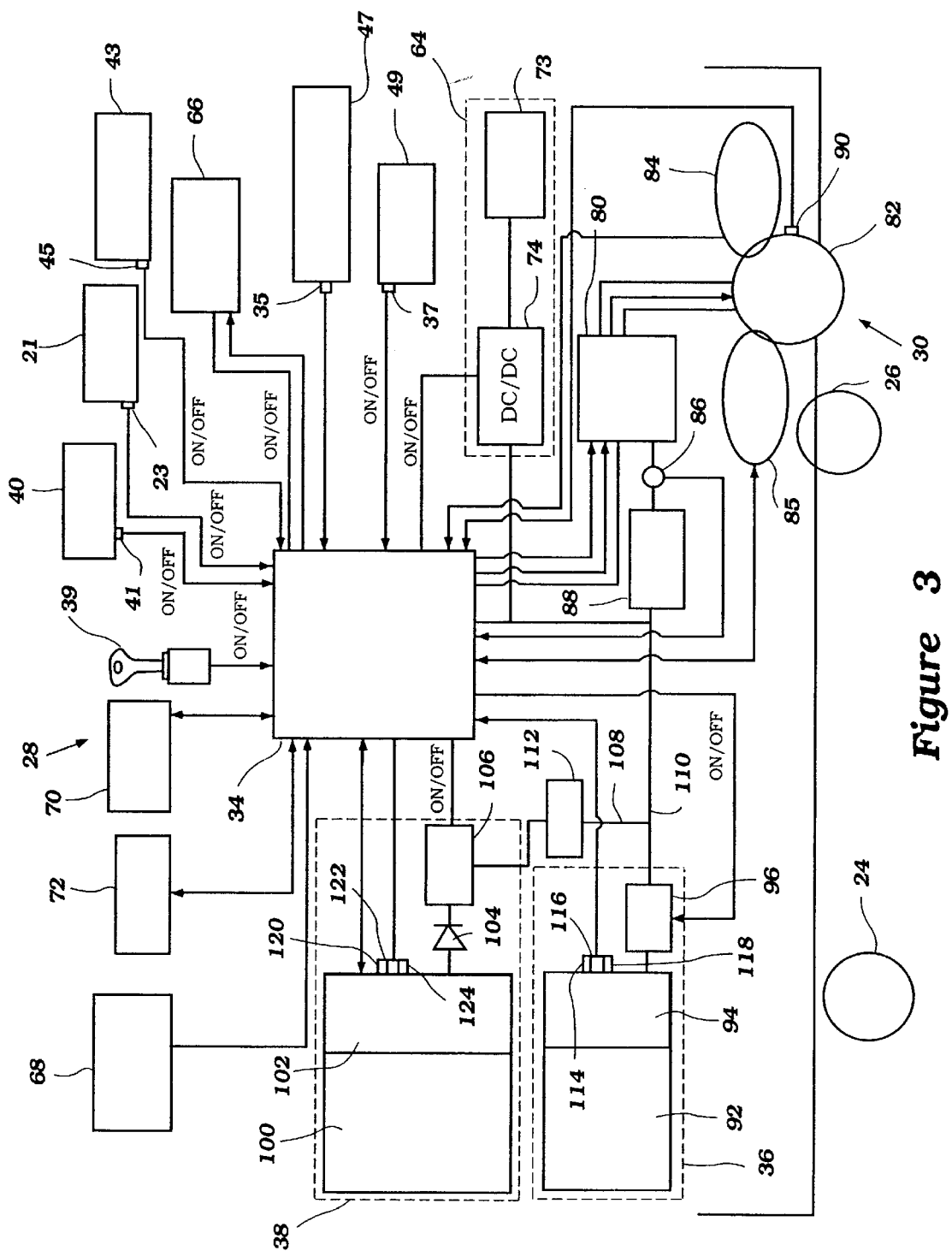
FIG. 3 is block diagram of a control system having certain features, aspects and advantages of the present invention.

In vehicles requiring support when not being operated, such as in the illustrated arrangement, a stand 21 can be used. The stand 21 is schematically illustrated in FIG. 3. The stand 21 can be provided with a stand sensor 23 (see FIG. 3) that detects an operational position of the stand 21. For instance, the stand sensor 23 detects whether the stand 21 is deployed for use or retracted into a stowed position.

The vehicle 20 is powered by a drive system 28. In the illustrated arrangement, the drive system 28 comprises an electric motor unit 30, a transmission 32, a vehicle controller 34, a battery unit 36 and a fuel cell unit 38. Each of these components will be described in greater detail below.

The electric motor unit 30 powers the rear wheel 26 of the illustrated arrangement through the transmission 32. Any suitable transmission 32 can be used. In the illustrated arrangement, a pair of pulleys or sprockets are interconnected by a flexible transmitter such as a chain or a belt. Preferably, the transmission 32 is a change-speed type of transmission. In one arrangement, the transmission 32 is a continuously variable speed transmission that changes speeds over a continuum in response to changes in operator demand.

Power preferably is supplied to the electric motor unit 30 from the battery unit 36 and the fuel cell unit 38 under the control of the vehicle controller 34, which is arranged and configured in accordance with certain features, aspects and advantages of the present invention. The illustrated vehicle drive system 28 comprises a pair of energy sources: the fuel cell, which is contained within the fuel cell unit 38 and which is disposed behind the operator position, and the battery unit 36, which is disposed generally below a fuel tank 46. Of course, other locations can be used to house the battery unit 36 and the fuel cell unit 38. Preferably, the fuel cell unit 38 is disposed rearwardly of a seat 40 and generally above the rear wheel 26. Advantageously, in the illustrated arrangement, this location places the larger portion of the fuel cell unit weight over the driving rear wheel 26, which is non-steering.

The frame 22 carries the seat 40 and a set of front forks 42 that can be used to steer the front wheel 24 in any suitable manner. A seat sensor 41 (see FIG. 3) preferably is disposed on or about the seat 40. The seat sensor 41 can be used to detect the presence of an operator in an operating position. It should be noted that the front forks 42 are connected to a set of handle bars 44 in the illustrated arrangement. Of course, the handlebars 44 can be replaced by any other suitable operator control (i.e., steering wheels, toggle bars, foot pedals, etc.) and can be connected to a suitable steering assembly. The steering assembly can be of any suitable construction and can be used to guide the vehicle along a desired path of motion.

The handle bars 44 in the illustrated arrangement support one or more of a group of controls for the vehicle 20. In addition, a dashboard can be provided on which other controls can be mounted. For instance, a main switch 39 (see FIG. 3) can be positioned in any suitable location. In the illustrated application, the main switch 39 desirably is disposed forwardly of the operators seat 40. In some applications, the main switch 39 is mounted to the handlebars 44. The main switch 39 may require the use of a key in some applications.

Additionally, an accelerator control member 47 and at least one brake control lever 49 preferably are mounted to the handlebars 44. These elements are schematically represented in FIG. 3. Of course, in some applications, the control member 47 and the control lever 49 can be positioned for foot control. The control member 47 can be a twist grip member, a thumb paddle or a finger trigger, among other constructions. Similarly, the brake control lever 49 can have any suitable construction. The brake control lever 49 can control a simple single wheel braking system or can control more complex arrangements (i.e., regenerative braking systems). Moreover, more than one brake control lever can be provided and the brake control lever 49 can be pedals in some applications. An accelerator control sensor 35 (see FIG. 3) is provided that monitors operator demand as indicated by movement of the accelerator control member 47. Of course, the accelerator control sensor 35 also can detect operator demand in other manners. Additionally, a brake control sensor 37 (see FIG. 3) is provided that detects operator demands on the braking system.

A display arrangement can be provided forward of the operator. The display arrangement can feature a gauge cluster, a digital display or any other optical output system. With reference to FIG. 3, the illustrated vehicle 20 features an indicator lamp 64, a read-out 66 and an input device 68. The lamp 64 can be used to alert the operator to various operating conditions, as will become apparent. The read-out 66 preferably can be used to display variable levels, such as changing charge levels or power demand. The operator can input various data from the user input device 68 to the vehicle controller 34 to change, for example, the operating characteristics of the vehicle 20. Also, data can be transferred between a non-volatile memory 70 and a timer 72. Operating conditions of the vehicle 20 also can be transferred to the non-volatile memory 72 from any of a number of components and sensors when the vehicle 20 is stopped. These operating conditions then can be read by the vehicle controller 34 when the vehicle 20 resumes operation.

In some applications, the frame 22 can support at least one footrest 43. The footrest 43 is schematically illustrated in FIG. 3. The footrest 43 can comprise a single bar that extends to both sides of the frame assembly 22. In some applications, the footrest 43 can comprise at least one floor board that is disposed such that the feet of the operator can be positioned on the footrest 43 during operation of the vehicle 20. Any suitable footrest construction can be used. In the illustrated arrangement, the footrest 43 is fitted with at least one, and preferably more than one, footrest sensor 45 (see FIG. 3). In general, the footrest sensor 45 detects an operational characteristic of the vehicle 20. In the illustrated arrangement, the footrest sensor 45 detects whether the operator has a foot positioned on the footrest 43 and, in some applications, whether the operator has both feet positioned on the footrest 43.

A fuel tank 46 desirably is interposed between the handlebars 44 and the seat 40. The fuel tank 46 can hold a suitable fuel, such as methanol, hydrogen, butane and the like, prior to use of the fuel within the fuel cell unit 38. In the illustrated arrangement, the fuel tank 46 holds a supply of methanol. The fuel tank 46 preferably includes a fuel cap 48. The fuel cap 48 can be configured to close the fuel tank 46 such that leakage from the fuel tank 46 through a refueling nozzle can be reduced or eliminated.

With reference now to FIG. 2(A), the exemplary hybrid vehicle 20 illustrated therein comprises a vehicle controller 34 and a battery unit 36, which is disposed generally under the seat 40. In the illustrated arrangement, the electric motor unit 30 is disposed generally below the vehicle controller 34. The fuel cell unit 38 is disposed forwardly of the illustrated electric motor unit 30 and is connected to a remote hydrogen supplying device 52. The device 52, in the illustrated arrangement, is mounted rearward of the seat 40 on a rack 50. The hydrogen supplying device 52 supplies hydrogen to the fuel cell unit 38 for power generation.

Figure 2B:
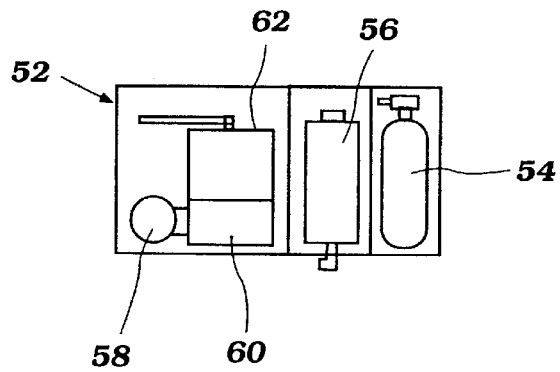
FIG. 2(B) is a schematic illustration of a hydrogen supplying device of the vehicle of FIG. 2(A)

With reference now to FIG. 2(B), the hydrogen supplying device 52 preferably comprises a hydrogen tank 54 and a methanol tank 56. The illustrated hydrogen supplying device 52 further comprises a fan 58 and a burner 60. The fan 58 supplies air to the burner 60. Moreover, the illustrated hydrogen supplying device 52 comprises a reformer 62 that produces hydrogen in a manner that will be discussed. During the reformation process, the methanol is combusted by the burner 60 along with air supplied by the fan 58.

With reference now to FIG. 3, a block diagram of the drive system 28 is illustrated therein. The block diagram illustrates a number of electrical interconnections between various components described above. While the illustrated drive system has certain features, aspects and advantages in accordance with the present invention, other components and electrical connections also can be used.

With continued reference to FIG. 3, power signals (i.e., ON/OFF) are sent from the main switch 39 to the vehicle controller 34. The power signals can be used to place the motor unit 30 in an activated or deactivated status. The seat sensor 41, the footrest sensor 45, the stand sensor 23 and the brake sensor 37 also communicate with the vehicle controller 34. Preferably, the main switch 39, the seat sensor 41, the footrest sensor 45, the stand sensor 23 and the brake sensor 37 are high/low sensors that output a binary signal. Thus, the vehicle controller 34 can detect the operating condition of each of these sensors. The vehicle controller 34 also is in electrical communication with the input device 68 and the non-volatile memory 70. Detected data such as the operating conditions of the electric motor unit 30 (for example, number of revolution), throttle opening, running speed, request load, temperature and shift position are sent to the vehicle controller 34 to update the memory in the vehicle controller 34.

The accelerator control member 47 provides a mechanism through which the output of the motor unit 30 can be controlled. As described above, an accelerator sensor 35 preferably is fitted to the accelerator control member 47. The sensor 35 desirably outputs signals that are indicative of the accelerator control member position and, therefore, operator demand. The vehicle controller 34 can control the output of the electric motor unit 30 based on the output setting value from the accelerator control member 47 as indicated by the accelerator sensor 35.

In the illustrated arrangement, the read-out 66 is controlled by indicator signals transmitted from the vehicle controller 34 based upon the operating conditions of the vehicle 20. The lamp unit 64 preferably includes a light 73, an LED, or the like and can provide a steady output, a variable output or an intermittent output. Control signals from the vehicle controller 34 drive a DC/DC converter 74 to illuminate the light or lights 73 of the lamp unit 64.

With continued reference to FIG. 3, the illustrated electric motor unit 30 generally comprises a motor driver 80, an electric motor 82 that is connected to the drive wheel 26 through the transmission 32, an encoder 84, a regenerative current sensor 86 and regenerative energy control module 88. The motor unit 30 also preferably includes a speed reducer 85 that receives speed reducing commands from the control unit 34. The speed reducer 85, in some applications, comprises the transmission 32, which can be controlled to increase or decrease the speed of the vehicle 20. The motor driver 80 preferably controls the electric motor 82 through duty signals that emanate from the vehicle controller 34. The illustrated encoder 84 detects the position of a set of magnetic poles of the electric motor 82 and also detects the speed of the electric motor 82. Information of the motor speed from the encoder 84 can be stored in a memory unit that is in electrical communication with the motor driver 80. The data from this memory unit can be sent to the vehicle controller 34 as desired.

In the illustrated arrangement, the electric motor unit 30 also comprises a motor voltage sensor and/or a motor current sensor 90. The sensor 90 can detect the level of voltage applied across the motor 82 and/or the level of current passing through the motor 82. The information of the voltage and the current passing through the motor 82 can be stored in a memory unit that is in electrical communication with the motor driver 80. The stored information can be sent to the vehicle controller 34 as desired.

With continued reference to FIG. 3, the battery unit 36 preferably comprises a battery 92, a battery controller 94 and a battery relay 96. The fuel cell unit 38 preferably comprises a fuel cell 100 to generate electrical power, a fuel cell controller 102, a reverse current prevention element 104 and a fuel cell relay 106. The fuel cell unit 38 and the battery unit 36 of the illustrated arrangement are in electrical communication through a first circuit 108. The first circuit supplies output current from the fuel cell unit 38 to the battery unit 36 and/or the motor unit 30. Thus, the battery 92 of the battery unit 36 can be charged by output power from the fuel cell 100 of the fuel cell unit 38. Preferably, a second circuit 110 supplies output current from the battery unit 36 and/or the fuel cell unit 38 to the electric motor unit 30.

The battery controller 94 can detect a charging condition of the battery 92. In the illustrated arrangement, the battery controller 94 detects the charging condition of the battery with a battery temperature sensor 114, a battery voltage sensor 116 and a battery current sensor 118. Information from these sensors 114, 116, 118 can be stored in a memory in the battery controller 94. This information also can be loaded into the vehicle controller 34 as desired.

In the illustrated arrangement, the battery relay 96 can be activated by a signal supplied by the vehicle controller 34 such that a supply of electric power through the second circuit 112 can be controlled. Thus, the depletion of energy in the battery can be moderated by controlling the supply of power from the battery 92 to the motor 82.

In the illustrated arrangement, the vehicle controller 34 outputs control signals to the fuel cell controller 102. The fuel cell controller 102 preferably controls the fuel cell 100 according to the signals received from the vehicle controller 34. The fuel cell controller 102 preferably also includes an assembly that can be used to detect the operational characteristics of the fuel cell 100. The assembly in the illustrated arrangement comprises at least a temperature sensor 120, a fuel cell voltage sensor 122 and a fuel cell current sensor 124. In the illustrated arrangement, information from these sensors 120, 122, 124 is stored in a memory unit of the fuel cell controller 102. This information can be transferred to the vehicle controller 34 as desired.

In the illustrated arrangement, the fuel cell relay 106 is connected to the fuel cell controller 102 through the reverse current prevention element 104 (i.e., a rectifier diode, for instance). The relay 106 can be activated by signals received from the vehicle controller 34 such that power is selectively supplied through the first circuit 108. Thus, the relay 106 controls whether power is supplied from the fuel cell 100 to the battery 92.

Figure 4:
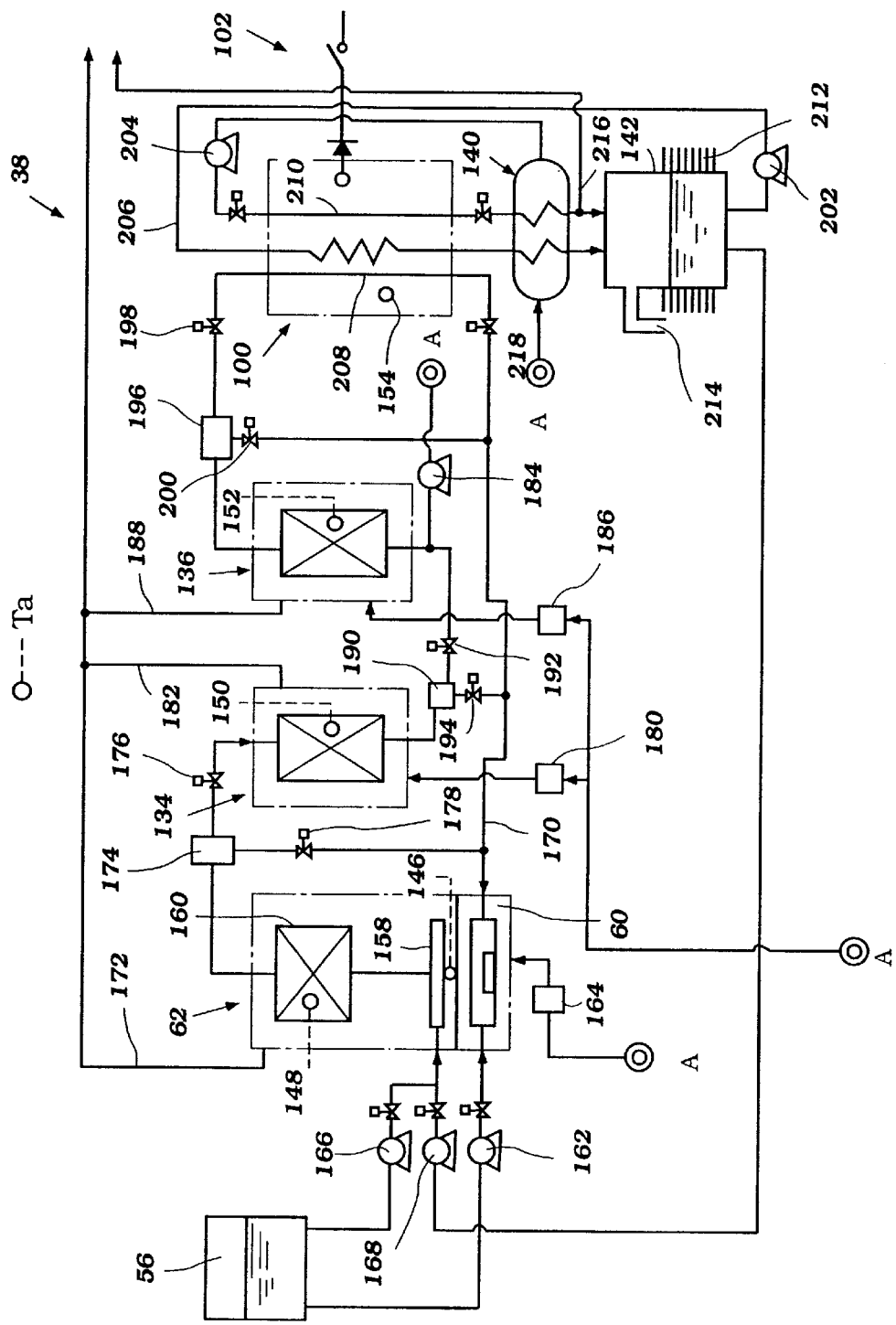
FIG. 4 is an exemplary circuit diagram of a portion of a fuel cell unit having certain features, aspects and advantages of the present invention.

With reference now to FIG. 4, a fuel cell unit 38 having certain features, aspects and advantages in accordance with the present invention is illustrated therein. The fuel cell unit 38 in this arrangement comprises the methanol tank 56, the reformer 62, a shift converter 134, a selective oxidation reactor 136, the fuel cell 100, a moisture collecting heat exchanger 140, a water tank 142 and the fuel cell battery controller 102. In addition, the illustrated fuel cell unit 38 also comprises various devices such as valves, pumps and fans, and sensors.

The reformer 62, the shift converter 134, the selective oxidation reactor 136 and the fuel cell 100 preferably are provided with temperature sensors. In particular, the reformer 62 has at least two temperature sensors 146, 148. The shift converter 134 has a temperature sensor 150. The selective oxidation reactor 136 has a temperature sensor 152 and the fuel cell 100 has a temperature sensor 154. The temperature sensors provide output to the fuel cell battery controller 94, which controls the operating temperature of these components in the illustrated arrangement.

In the illustrated arrangement, the reformer 62 comprises the burner 60, an evaporator 158 and a catalyst layer 160. Methanol is supplied to the burner 60 from the methanol tank 56 by a burner pump 162. The burner pump 162 is activated when the temperature exceeds a preset temperature. The temperature can be measured by output from the associated temperature sensor 146. Air is supplied to the burner 60 by a burner fan 164.

With reference again to FIG. 4, each double circle in the figure represents an air inlet. Methanol is supplied to the evaporator 158 from the methanol tank 56 by a methanol pump 166 and water is fed to the evaporator 158 from the water tank 142 by a water pump 168. The methanol and the water preferably are mixed together prior to introduction of the components into the evaporator 158. Surplus hydrogen also is supplied to the burner 60 through a bypass line 170. The surplus hydrogen is combusted within the burner 60 along with the methanol. The burner 60 heats the evaporator 158 to vaporize the mixture of methanol and water and the vaporized fuel mixture in the evaporator 158 is supplied to the catalyst layer 160.

The heat from the burner 60 also heats the catalyst layer 160 to maintain the temperature of the catalyst layer 160 high enough to cause a catalytic reaction. Exhaust gases and excess air that are not required for the reaction are exhausted to the atmosphere in any suitable manner, such as through an exhaust passage 172.

In the illustrated arrangement, the catalyst layer 160 is made, for example, of a Cu-base catalyst and the catalyst layer 160 advantageously resolves the vaporized mixture of methanol and water into hydrogen and carbon dioxide at a catalyst reaction temperature of about 300 Celsius as follows:

$$CH_3OH + H_2O \rightarrow 3H_2 + CO_2$$

In the catalyst layer 160, a very small amount (about 1%) of carbon monoxide is produced:

$$CH_3OH \rightarrow 2H_2 + CO$$

Because the carbon monoxide is at least partially adsorbed by the catalyst, the electromotive force of the reaction is lowered. Thus, the carbon monoxide concentration is further lowered in the shift converter 134, the selective oxidation reactor 136 and the fuel cell 100. After this series of reductions, the carbon monoxide concentration can be significantly reduced. More specifically, in the shift converter 134, carbon monoxide in the resolved gas is converted to carbon dioxide at a reaction temperature of about 200 Celsius in the following chemical reaction in which surplus water vapor is added:

$$CO + H_2O \rightarrow H_2 + CO_2$$

Through this conversion, the carbon monoxide concentration is lowered to the order of about 0.1%. In the selective oxidation reactor 136, residual carbon monoxide is further converted to carbon dioxide at a catalyst temperature of about 120 Celsius using a platinum-base catalyst in the following oxidation reaction:

$$2CO + O_2 \rightarrow 2CO_2$$

Thus, the carbon monoxide concentration is reduced further to at least 1/10 of the previous value or even less. The carbon monoxide concentration in the fuel cell 100, therefore, can be lowered to the order of between about ten parts per million to about one hundred parts per million.

The reformer 62 converts the raw material into hydrogen, as described above. The hydrogen created is supplied to the fuel cell 100 through the shift converter 134 and the selective oxidation reactor 136.

Between the reformer 62 and the shift converter 134 are provided a buffer tank 174 for reducing pulsation and pressure changes. Accordingly, a set of switching valves 176, 178 are provided and the hydrogen is returned to the burner 60 by manipulating these switching valves 176, 178.

The shift converter 134 preferably is cooled an airflow induced by a fan 180 when the sensed temperature of the shift converter 134 exceeds a preset temperature. Cooling air is discharged to the outside through an exhaust passage 182.

Hydrogen sent from the shift converter 134 is mixed with air fed by a reaction air pump 184 to be supplied to the selective oxidation reactor 136. The selective oxidation reactor 136 is cooled by a cooling fan 186 when the sensed temperature of the selective oxidation reactor 136 exceeds a preset temperature. The cooling air can be discharged to the atmosphere through an exhaust passage 188 that can join with the exhaust passage 182.

Between the shift converter 134 and the selective oxidation reactor 136 are provided a buffer tank 190 and a set of switching valves 192, 194. Hydrogen can be returned to the burner 60 through actuation of these valves 192, 194. Between the selective oxidation reactor 136 and the fuel cell 100 also are provided a buffer tank 196 and switching valves 198, 200 and hydrogen can be returned to the burner 60 in the reformer 62 through activation of these switching valves.

As a result of the flow control afforded by the switching valves 176, 178, the switching valves 192, 194, and the switching valves 198, 200, the amount of hydrogen supplied to the fuel cell 100 can be regulated for output control. In the present arrangement, excessive oxygen will be supplied with the hydrogen and output can be controlled based upon the amount of hydrogen being supplied.

Control of the fuel cell output can be accomplished in any suitable manner. In one arrangement, the desired fuel cell output is calculated by the vehicle controller 34 based upon data received from the fuel cell sensors 120, 122, 124 along with other operating conditions sensed by various other sensors. The required flow rate through each switching valve can be calculated by the vehicle controller 34 or the fuel cell controller 102 based on the desired fuel cell output, taking into account the lag time caused by the inertia in the hydrogen supply system (i.e., the time between the desire to increase the hydrogen quantity output by the fuel cell and the actual increase in the hydrogen quantity). The calculated flow rates are then transferred to each of the switching valves by the fuel cell controller 102 or the vehicle controller 34. In one arrangement, by increasing the supply quantity of the primary fuel, such as methanol, the evaporated amount of hydrogen can be increased. Of course, an increase in the evaporated amount of hydrogen increases the fuel cell output.

Water is supplied to the fuel cell 100 from the water tank 142 by a cooling and humidifying pump 202. Air is supplied from the moisture collection heat exchanger 140 by a pressurizing air pump 204 when the sensed temperature of the heat exchanger 140 exceeds a preset level. Power generation can be performed in the fuel cell 100 using the supplied water, air and hydrogen.

The fuel cell 100 preferably is configured such that electrodes are each formed with, for example, a platinum-base porous catalyst layer (not shown) provided on both sides of a cell film (not shown) with a cooling and humidifying water passage 206 formed therein. Hydrogen is supplied to one electrode from the selective oxidation reactor 136 through a hydrogen passage 208. Oxygen (i.e., air) is supplied to the other electrode through an oxygen passage 210. Hydrogen ions move from the hydrogen passage 208 of the hydrogen side electrode to the oxygen side electrode through the cell film and are combined with oxygen to form water. The migration of electrons (–) associated with the migration of the hydrogen ions (+) allows an electric current to flow between the electrodes for power generation.

The power generating reactor 100 generates heat. To cool the reactor 100 and to maintain smooth migration of hydrogen ions to the oxygen side electrode, water is supplied from the water tank 142 to the water passage 206 in the cell film between both electrodes by the pump 202. The water that has passed through the water passage 206 increases in temperature and exchanges heat with air in the heat exchanger 140. The water then returns to the water tank 142. Preferably, the water tank 142 is provided with a radiation fins 212 to increase the heat transfer away from the water. An overflow pipe 214 also is provided in the tank 142.

Air is introduced to the heat exchanger 140. The air, after absorbing heat from the higher temperature water, increases in temperature and is supplied to the oxygen passage 210 by the air pump 204. The increased temperature of the air supply increases the rate of combination with the hydrogen ions thereby providing a more effective electromotive force reaction. Thus, an air inlet preferably is provided near the selective oxidation reactor 136 or the catalyst layer 160, where the high temperature catalytic reaction occurs.

Oxygen in the air passing through the oxygen passage 210 is combined with the hydrogen ions to form water. The water is collected in the water tank 142. The surplus air (uncombined oxygen and nitrogen) then is discharged to the outside through an exhaust passage 216.

Water used in the fuel cell 100 and water produced by power generation, as described above, exchange heat with cooling air in the moisture collecting heat exchanger 140 and the water is returned to the water tank 142. Also, the surplus hydrogen used for power generation in the fuel cell 100 is returned to the burner 60 of the reformer 62 through a valve 218 and the bypass line 170.

As described above, the raw material is reformed to produce hydrogen in the reformer 62, in which the evaporator 158 is heated by the burner 60 and in which the raw material vaporized by the evaporator 158 is supplied to the catalyst layer 160. The hydrogen acquired then is supplied to the fuel cell 100 through the shift converter 134 and the selective oxidation reactor 136 for power generation. In some arrangements, hydrogen acquired from the selective oxygen reactor 136 can be temporarily stored, as shown in FIG. 2(B), in the hydrogen tank 54.

The output of the fuel cell 70, as shown in FIG. 3, is connected to the power regulating section 112 through the reverse current prevention element 72 and the fuel cell relay 106. The power regulating section 112, in turn, is connected to the battery 92 and the electric motor 82.

Although, in the foregoing arrangements, the reformer 62, the shift converter 134, and the selective oxidation reactor 136, among other components, are used for producing hydrogen from methanol, other fuels such as gasoline, methane and butane can be used. Preferably, the reformer 62 comprises a catalyst material appropriate for the selected fuel. In addition, the fuel cell unit 38 can comprise a hydrogen gas tank that is interchangeably mounted to the fuel cell unit 38. In other words, a rechargeable or disposable hydrogen tank can be used such that a depleted tank could be replaced with a new or recharged tank as needed or desired. The tanks could be refilled or prepared in a factory and shipped for distribution.

Figure 5:
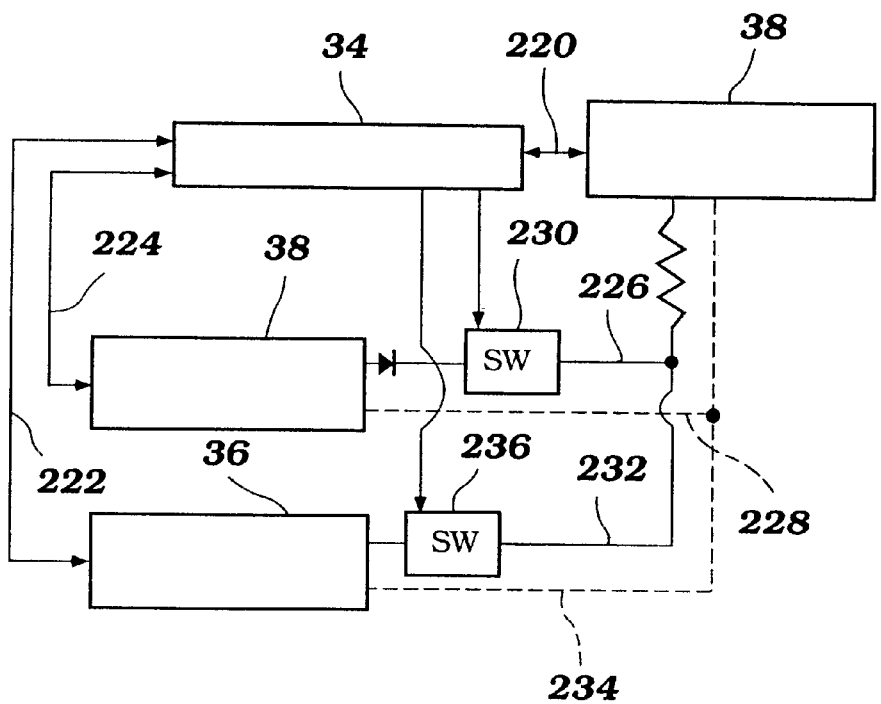
FIG. 5 is an exemplary circuit diagram of a power source control system having certain features, aspects and advantages of the present invention.

With reference now to FIG. 5, a schematic illustration of a power source control system having certain features, aspects and advantages of the present invention is illustrated therein. In the illustrated arrangement, the vehicle controller 34 is connected to the electric motor unit 30, the battery unit 36 and the fuel cell unit 38 through two-way communication lines 220, 222, 224, respectively. Preferably, the fuel cell unit 38 is connected to the electric motor unit 30 through a positive side current line 226 and a negative side current line 228. More preferably, a switch 230 is positioned along the positive side current line 226. In the illustrated arrangement, the switch 230 is turned ON and OFF by the vehicle controller 34. It should be noted that the switch 230 can comprise the relay 106 (see FIG. 3) in some arrangements.

With continued reference to FIG. 5, the battery unit 36 is connected to the electric motor unit 30 through a positive side current line 232 and a negative side current line 234 which are directly connected to the positive side current line 226 and the side current line 228, respectively. Preferably, a switch 236 is provided along the positive side current line 232. The switch 236 can be turned ON and OFF by the vehicle controller 34. Of course, in some arrangements, the switch 236 can comprise the relay 96 (see FIG. 3).

In the illustrated arrangement, the electric motor unit 30 comprises the motor driver 80, the encoder 32, the sensors 90 and the electric motor 82 (FIG. 3). In the presently preferred arrangement, each of these components are integrated together as a single module. Such an electric motor unit 30 can be removably mounted to the vehicle 20 as a unit. Therefore, the two-way communication line 220 and the current lines 226, 228, 232, 234 each can be connected between the electric motor unit 30 and the vehicle controller 34 using electrical couplers (not shown), such as quick connectors, clips and the like. In the following descriptions, similar types of connectors or couplers can be used where indicated.

The battery unit 36 preferably is an integrated unit featuring the battery controller 94, the sensors 114, 116, 188, the relay 96, and the battery 92, as shown in FIG. 3. Such a unitary construction can be removably mounted to the vehicle 20. To facilitate installation and removal, the two-way communication line 222 and the current lines 232, 234 can be connected to the battery controller 94 of the battery unit 36 through any suitable electrical couplers (not shown).

The battery controller 94 has a memory that can store data relating to the battery unit 38, such as temperature, voltage, current and the remaining capacity of the battery 92. This information can be continuously updated. The updated data can be transferred between the battery controller 94 and the vehicle controller 34 to calculate how much power will be required during operation and, when the battery 92 is replaced, the remaining capacity can be immediately recognized by the vehicle controller for processing of expected travel distance, for instance.

The fuel cell unit 38 preferably is an integrated unit as well. As such, the fuel cell unit 38 comprises a fuel cell controller 102, the sensors 120, 122, 124 (FIG. 3), the relay 106 and the fuel cell 100. More preferably, the reformer 62, the shift converter 134, the selective oxidation reactor 136 and the associated lines and valves are integrated into a single module. Such a fuel cell unit 38 can be removably mounted on the vehicle 20 and such a fuel cell unit 38 preferably comprises electrical couplers (not shown), such as quick connectors, that connect the two-way communication line 224 and the current lines 226, 228 to the fuel cell controller 102 of the fuel cell unit 38.

The fuel cell controller 102 preferably further comprises a memory unit in which data relating to the fuel cell unit conditions, such as temperature, voltage, current, and the capacity of the fuel cell (specifically, the remaining fuel contained within the methanol tank) can be stored. This data preferably is continuously updated during operation. The data advantageously can be transferred between the fuel cell controller 102 and the vehicle controller 34 to calculate how much power will be required during operation, to process expected travel distance and to perform other calculations.

Figure 6:
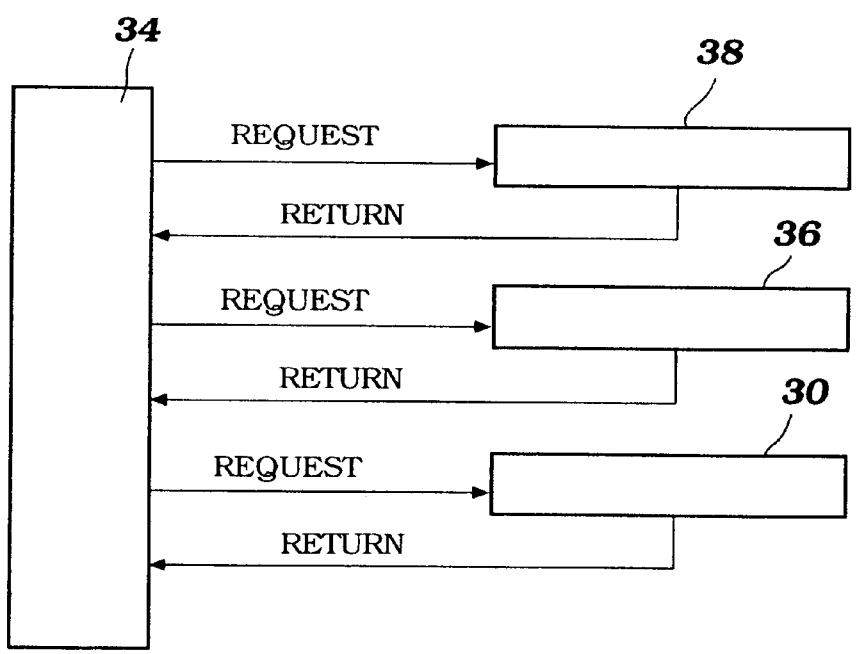
FIG. 6 is a block diagram of a control system of the hybrid vehicle arranged and configured in accordance with certain features, aspects and advantages of the present invention.

With reference now to FIG. 6, the vehicle controller 34 requests various data that is stored in memory units associated with the electric motor unit 30 (i.e., the encoder 84 and the other sensor group 90), the battery controller 94 and the fuel cell controller 102. The desired data is then returned to the vehicle controller 34. The desired data can include information relating to temperatures, voltages, currents, error information and capacity. The transferred data also can include requests for certain output from the vehicle controller 34.

In this case, the vehicle controller 34 calculates, on the basis of the data from the sensor group and the controllers 94, 71, the optimum amount of power to the units, and to the data of the amount of power are sent, as operation command data, to the motor driver 30 and controllers 94, 71 for the control of the electric motor unit 30, battery unit 36 and fuel cell unit 38.

Figure 7:
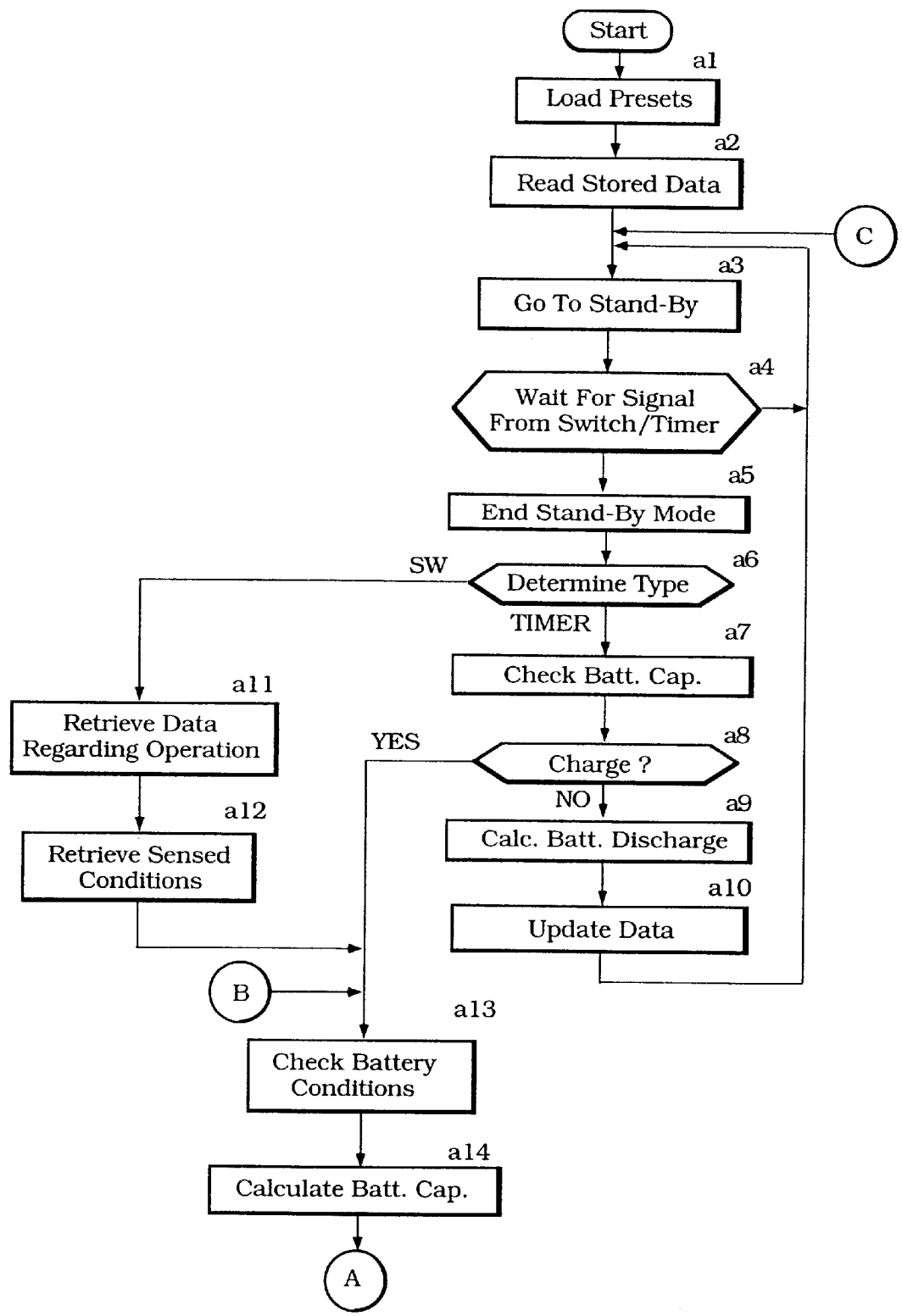
FIGS. 7 and 8 are a flowchart of a control method for the hybrid vehicle, the method having certain features, aspects and advantages of the present invention.
Figure 8:
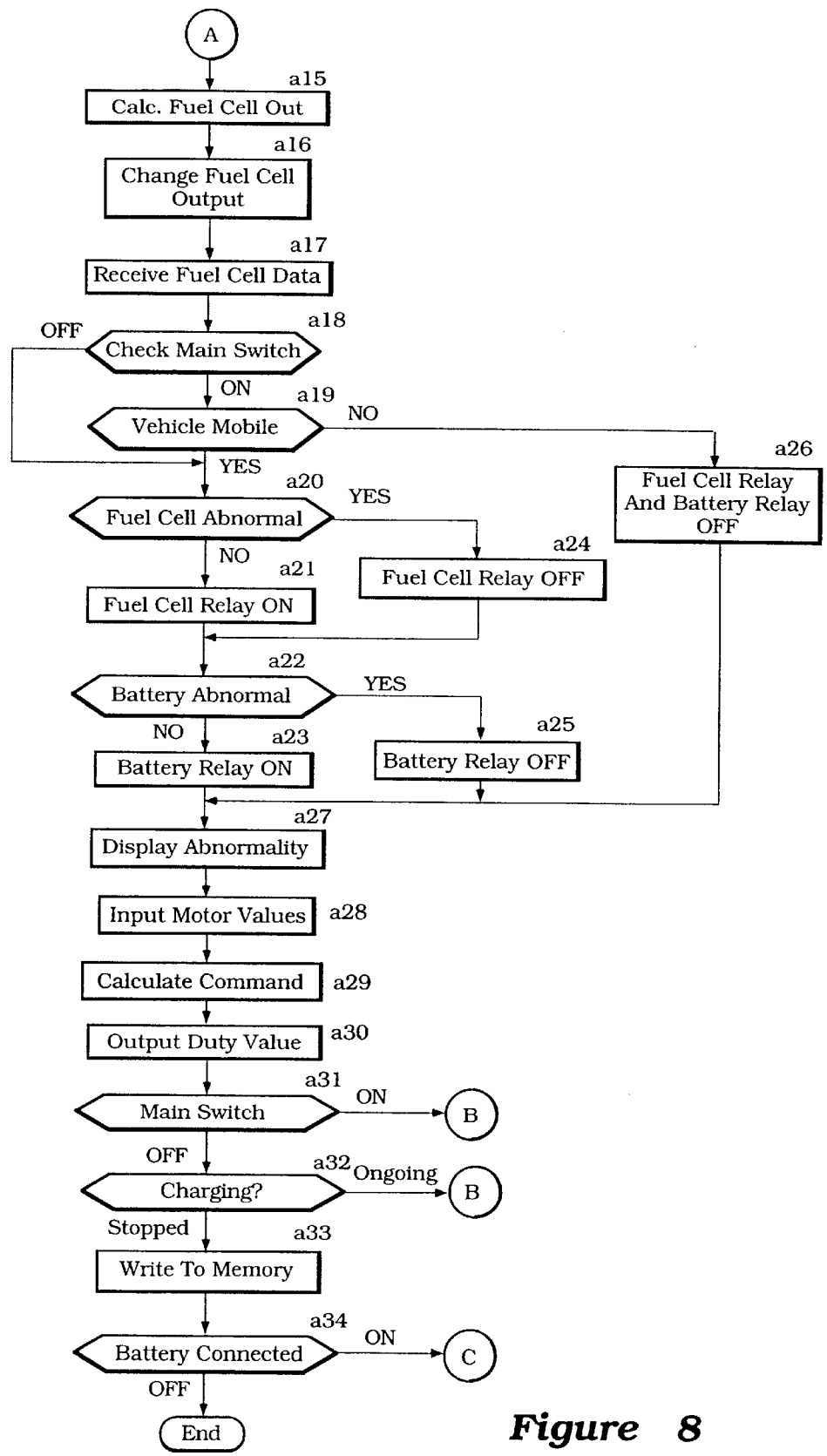

With reference now to FIGS. 7 and 8, a control arrangement having certain features, aspects and advantages of the present invention is illustrated therein. The illustrated arrangement is presented in a flow chart. It should be noted that some of the steps that are presented as distinct steps can be combined, reordered or modified in manners that will be apparent to those of ordinary skill in the art. In addition, some of the steps can be further subdivided if desired. This principle extends to all flowcharts and routines described herein. In general, the routine described in FIGS. 7 and 8 is carried out by the vehicle controller 34; however, any other controller or combination of controllers associated with the vehicle 20 can also be used to carry out the routine. Again, this principle also extends to all other flowcharts and routines described herein.

The routine begins by setting various flags and initial values for various data, such as motor duty information, at preset values (see A-1). The controller 34 then obtains any stored information regarding previous operation of the vehicle 20 from the non-volatile memory 70 (see A-2). This information also can be gathered from other memory locations if desired.

The controller then enters into a stand-by mode (see A-3). The stand-by mode operates the control system in at a reduced current draw. Preferably, the current draw is reduced to a level that supports continued execution of the program, monitoring of the main switch 39 and of the timer 72 for an output signal.

The controller then determines whether there the timer 72 is outputting a signal or if the main switch 39 is outputting a signal (see A-4). The timer signal can be indicative of a preset period of time having elapsed. In some applications, an output signal is generated by the timer at given time intervals (for example, every one hour). Preferably, the timer 72 is operated by the controller with battery power. The main switch in the illustrated arrangement is configured to output a signal when the switch is moved to an ON position.

Once either output signal is detected, the stand-by mode is cancelled (see A-5). The type of output signal then is detected (see A-6). If the signal was from the main switch then the routine goes to A-11 and if the signal was from the timer then the routine goes to A-7.

If the timer signal was detected, the battery capacity data stored in memory is read (see A-7). Preferably, this data is stored in RAM and, more preferably, this data is stored in the battery controller 94. After obtaining the battery capacity data, the controller determines whether or not the battery needs to be charged (see A-8). This question is answered by comparing the battery capacity data to preset values.

If no charging is necessary, the level of discharge from the battery is calculated (see A-9). After calculating the level of battery discharge, the battery capacity data can be updated in memory (see A-10). As discussed above, the data can be updated in the RAM of the battery controller 94.

If the output signal detected by the controller was generated by the main switch 39 being turned to an ON-position, then the controller uploads or retrieves any stored data relating to the next operation of the vehicle (see A-11). In addition, the controller retrieves output signals from each sensor (see A-12). For instance, the controller can retrieve signals from the seat sensor, the footrest sensors, the brake sensor and the throttle angle sensor. This data can be used to determine whether the fuel cell should be turned off.

After retrieving the desired information, the controller obtains information regarding the operating condition of the battery source (see A-13). For instance, the controller can retrieve real-time information relating to the temperature, voltage and current of the battery. This data can be used to calculate the capacity of the battery (see A-14). The capacity of the battery should be corrected based upon the input data, such as temperature, for instance.

The controller also calculates the current output level of the fuel cell (see A-15). In one arrangement, the current output level is calculated by using a map or a calculation formula based on the detected temperature data or capacity data relating to the battery.

The controller then determines whether to stop the fuel cell from generating further output or whether to change the level of the fuel cell output (see A-16). The controller also continues to receive data from the fuel cell (see A-17). The data that the controller continues to receive can comprise data relating to the operating conditions (power generation quantity, temperature, output voltage and current) of the fuel cell along with an abnormal flag. The abnormal flag in one arrangement is set to "1" when an abnormality is detected in the operating conditions of the fuel cell. In this manner, an alert can be issued regarding the abnormality.

The controller determines whether the main switch 39 has been moved into the ON-position or the OFF-position (see A-18). In addition, the controller determines whether the operator is running the vehicle or if the vehicle is stationary (see A-19). In one application, the controller determines that the vehicle is running when the seat sensor outputs a signal indicative of the operator being positioned on the seat or when the stand sensor outputs a signal indicative of the stand being positioned in the stowed location.

If the vehicle is mobile (i.e., the operator in the riding position on the seat or the stand is in the stowed position), then the controller determines whether an abnormal flag of the fuel cell is a "1" or a "0." Of course, in the illustrated arrangement, the "1" indicates that a fuel cell abnormality has been detected while a "0" indicates that a fuel cell abnormality has not been detected. If the fuel cell is functioning properly, then the fuel cell relay is turned on (see A-21). If the fuel cell is not functioning properly, then the fuel cell relay is turned off (see A-24).

The controller also checks to see if the battery is functioning abnormally (see A-22). In one arrangement, this check is performed by monitoring for an abnormal flag that is set to "1". If the battery is functioning properly, then the battery relay is turned on (see A-23). If the battery is functioning improperly or abnormally, then the battery relay is turned off (see A-25).

Of course, if the controller determines that the vehicle 20 is not being ridden (i.e., the stand is down or the rider is not on the vehicle), then both the fuel cell relay and the battery relay can be turned off (see A-26). In the event than any abnormality has been identified, the specific abnormality can be displayed to the operator on the read-out 66 (see A-27).

The current value for the motor is then entered into the controller (see A-28). The current value can be indicative of the operating load of the motor. Preferably, the motor current value is set at zero when the main switch is in an OFF-position and when the battery is being charged by the fuel cell.

The controller then calculates a motor current command value (see A-29). The motor current command value also preferably is indicative of an operator demand upon the motor. For instance, the value can be larger for a wider throttle angle of the throttle lever, which typically indicates that the operator wants to increase the speed of the vehicle or increase the power output from the engine. Thus, the controller can compare the demands of the operator to the current level of operation and prepare an appropriate output value.

The controller then can output a duty value to the motor that corresponds to the calculated command value (see A-30). Preferably, the duty value is a command value used for driving the motor and can be a function of the motor current command value. The duty value preferably shows qualitatively a larger value for a larger motor current command value.

The controller can continue to monitor the positioning of the main switch (see A-31). Once the main switch is placed in the OFF-position, the controller can evaluate whether the fuel cell is charging the battery or whether the battery charging process has been completed (see A-32). If the battery is fully charged and the relay is placed in the OFF position due to an abnormality, then the charging operation is stopped. If not, then the charging operation likely is continuing. If the charging has stopped, the current battery capacity is recorded in the non-volatile memory. For instance, this data can be recalled when the routine resumes (i.e., A-2).

Finally, the controller can determine whether the battery is connected or not (see A-34). If the battery is connected, then the program continues although the main switch has been moved to an OFF-position. The program continues so that the fuel cell can charge the battery and so that the controller can perform capacity control relating to the battery.

Figure 9:
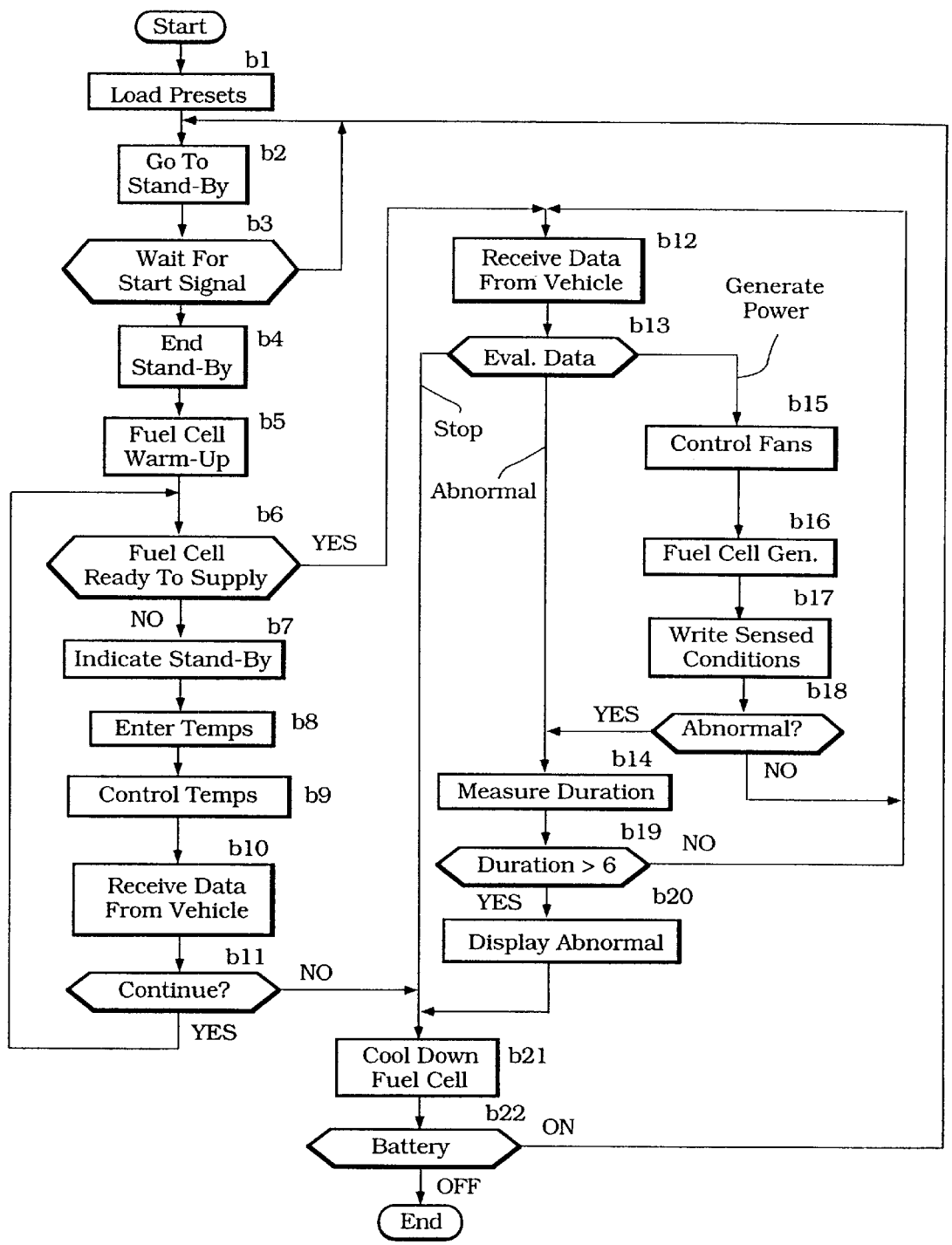
FIG. 9 is a flowchart of a control method for a fuel cell, the method having certain features, aspects and advantages of the present invention.

With reference now to FIG. 9, a routine having certain other features, aspects and advantages in accordance with the present invention is illustrated therein. This routine controls at least some of the operations of the fuel cell. In accordance with this routine, the controller, which can be the fuel cell controller 102, sets various flags at preset initial values (see B-1). The controller then enters a stand-by mode such as that described above (see B-2).

The controller preferably determines whether or not an external starting signal from the vehicle controller for starting the fuel cell exists (see B-3). If the starting signal is detected, then the controller exits the stand-by mode (see B-4). The controller then initiates a fuel cell warm-up subroutine (see B-5). In one arrangement, warming up the fuel cell involves drawing a hydrogen gas supply mainly from the reformer.

The controller also preferably determines whether or not the fuel cell is ready to generate electrical power (see B-6). If the fuel cell is not yet ready to supply electricity, then the operator is alerted that the fuel cell is not yet operational (see B-7). In one arrangement, the operator is alerted through output directed to the display (i.e., the read-out 66) or through output directed to another visual, audible or tactile alert component.

The operating temperatures of the fuel cell unit components are then entered into the controller (see B-8). The fuel cell unit components can be controlled to maintain the sensed temperatures of each of the components within a desired temperature range associated with each of the components (see B-9).

The controller also receives data from the vehicle 20 regarding whether or not the warm-up cycle should continue (see B-10) and the controller determines from this data whether or not to continue preparing to generate power (see B-11). If the controller determines that the fuel cell should continue being prepared then the subroutine begins again (i.e., returns to B-6). On the other hand, if the controller determines that the fuel cell is sufficiently prepared, then the routine continues on (i.e., skips to B-21).

Once the fuel cell is ready to generate electrical power, then the controller receives data regarding whether or not the fuel cell is generating power (see B-12). The controller determines whether the data indicates that power is not being generated, that the data is not being communicated, that the data is being garbled by noise, or that power is being generated and how much is being generated (see B-13).

If there is a detected abnormality in the data or in the fuel cell condition, then the duration of the abnormality is measured (see B-14). If, on the other hand, a power generation signal is received, then the controller controls the fans to provide adequate cooling (see B-15). Power is then generated by the fuel cell (see B-16) and the sensed values from the fuel cell unit sensors 120, 122, 124 are written to memory (see B-17). The controller also determines whether or not the fuel cell is operating abnormally based on the signals being written (see B-18).

In the event of an abnormality, the duration of the abnormality can be monitored (see B-14). The controller preferably determines whether or not the duration of the abnormal condition exceeds a preset time G (for example, two seconds). Once the abnormality has been detected for a period longer than the preset time G, the controller can indicate the presence of the abnormality to the operator (see B-20). In one arrangement, the controller indicates the presence of the abnormality through lights or other visual displays. In other arrangements, the abnormality can be indicated through audible or tactile alarms.

The fuel cell then can be cooled down after a stop signal is detected or an abnormality has persisted for longer than the preset time G (see B-21). The controller can determine whether or not the battery is to be disabled or put into an OFF-configuration (see B-22). If the battery should be disabled, then the controller disconnects the battery and operation of the vehicle is stopped. If the battery should remain ON, then the routine begins just after the time at which the presets were loaded into the controller (i.e., return to B-2) and the routine repeats until the battery is turned OFF.

Figure 10:
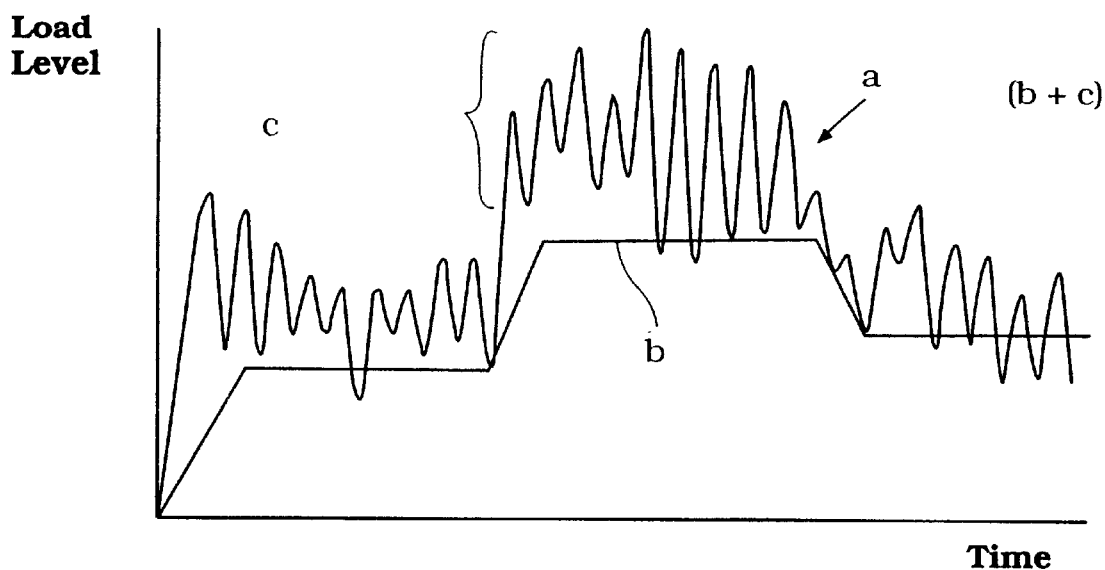
FIG. 10 is a graphical illustration of the load levels on a power source over time.

With reference now to FIG. 10, a graphical illustration of burden ratios of a power source being controlled in accordance with certain features, aspects and advantages of the present invention is presented. The graph depicts patterns of the load change for an electric motor in an electric vehicle. Generally speaking, the term "load" signifies the demanded load, such as that input through an accelerator device by an operator (e.g., intending to accelerate vehicle speed or to maintain speed at on an up-slope). The term "load" also can signify the external load applied to the electric motor from the environment of use, such as an air resistance, an ascending slope or a descending slope. When used herein, the term "load" refers to the output of the electric motor. Preferably, however, this output balances with the external load and will be increased or decreased in response to changes in the external load. It should be recognized that, in a lightweight vehicle, such as a two-wheeled vehicle, the external load is apt to change due to irregular road surfaces. In addition, the speed also is apt to vary depending upon changes in motor output. Moreover, the requested load is apt to change when the driver wants to suddenly change speeds.

With reference again to FIG. 10, the letter "a" in this figure denotes the overall load level and the letter "b" in this figure denotes a portion of the overall load level. More particularly, the variable level indicated by "a" is the combination of a base level that is indicated by "b" and a fluctuating level that is indicated by "c". Thus, the letter "b" denotes a portion of the load that is substantially stable in nature (i.e., the base load). Preferably, the base load is supplied by the fuel cell. This takes advantage of the operating characteristics of the fuel cell. In addition, the wildly fluctuating portion of the load in the illustrated arrangement preferably is supplied by the battery. This also takes advantages of the operating characteristics of the battery. The combination of the two power sources in this manner reduces the drastic load changes experience by the batteries in previous arrangements and allows the supplied power to track more closely the demanded power. In one arrangement, the base load "b" as the targeted value for the output of the fuel cell is determined depending on the overall load level. For example, it is determined as a given ratio to the average value of the fluctuating load. Also, the base load can be determined depending upon various operating modes or the like.

Figure 11:
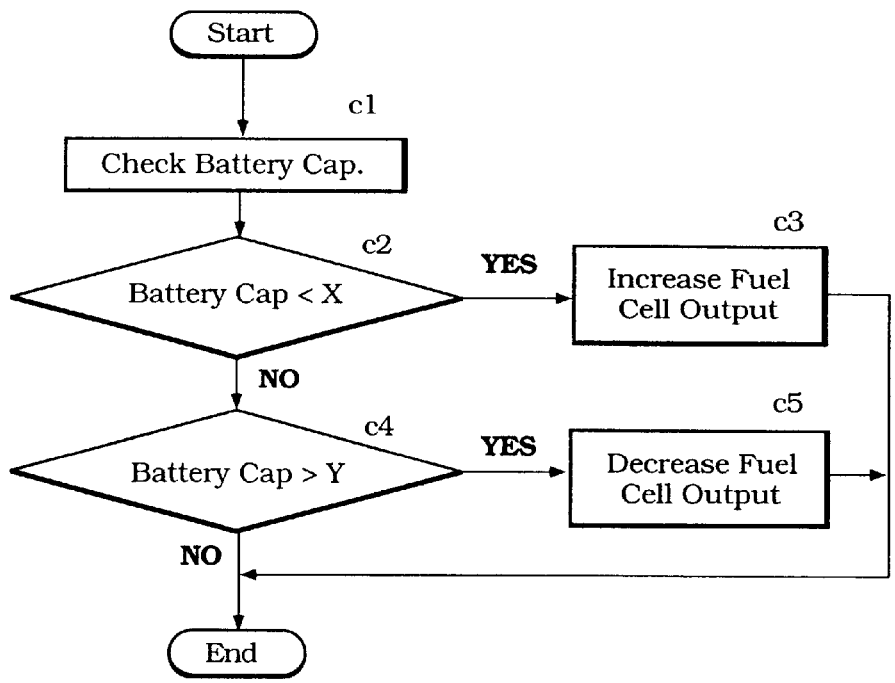
FIG. 11 is a flow chart of a power source control method having certain features, aspects and advantages of the invention.

With reference now to FIG. 11, a power source control method having certain features, aspects and advantages in accordance with the present invention is illustrated therein. As will be recognized, battery capacity can be adversely impacted under certain operating conditions, such as when the battery is consistently under charged. Under such conditions, the life of the battery is shortened and therefore the number of miles capable of being driven on a single charge is greatly reduced. Additionally, over time, the battery may not fully recharge and the overall condition of the battery deteriorates. On the other hand, if the battery is consistently overcharged, the battery also may prematurely degrade. Accordingly, it is desired to maintain the battery capacity at the adequate level.

Figure 12:
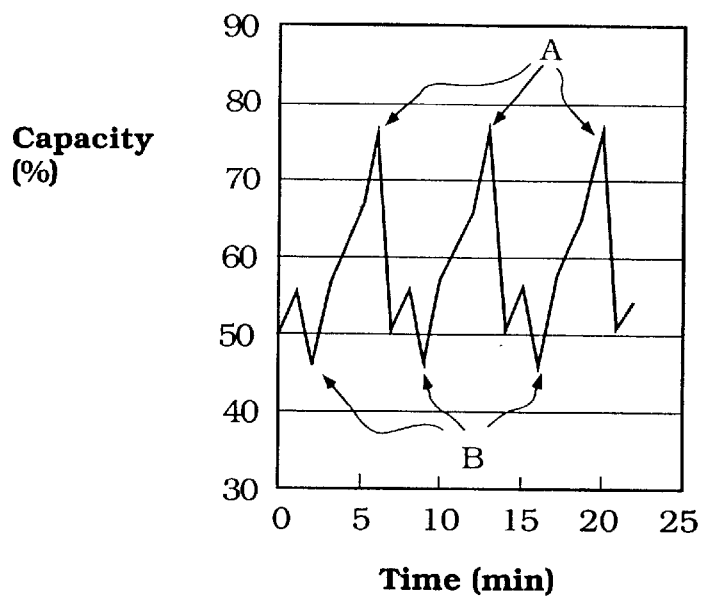
FIG. 12 is a graphical illustration of battery capacity fluctuations resulting from operation of the vehicle in accordance with the method illustrated in FIG. 11.

With reference again to FIG. 11, the battery capacity is first detected (see C-1). The detected battery capacity then is compared to a lower value of an acceptable range (see C-2). The value can be, for example, 50% of the maximum capacity of the battery. If the sensed battery capacity is not more than the lower value (i.e., the point B in FIG. 12), then the fuel cell output is increased (see C-3). A warning that the battery capacity is low can be displayed to the operator using an LED or the like. Increasing the output of the fuel cell reduces the burden on the battery. Additionally, part of the output increase of the fuel cell can be used to charge the battery. Charging the battery can substantially restore the battery capacity.

If the sensed battery capacity is greater than the lower value, then the sensed battery capacity is compared to an upper value of the acceptable range (see C-4). This upper value can be, for example, 70% of the maximum battery capacity. If the sensed battery capacity is greater than the upper value (i.e., at the point A in FIG. 12), then the output of the fuel cell is decreased (see C-5). As described above, a warning can be displayed though an LED or the like that the battery capacity is high. The decrease of the output of the fuel cell causes an increase of the battery burden and, therefore, the battery discharge increases. Thus, the battery capacity is reduced.

If the battery capacity is between the upper value and the lower value, normal operation can be performed according to any suitable routine, such as that illustrated in FIGS. 7 and 8. Thus, by employing this control routine, the battery capacity can be maintained between the upper usage limit (for example, 80% of maximum) and the lower usage limit (for example, 40% of maximum) by comparing the sensed battery charge with the upper limit (for example, 70% of maximum) and the lower limit (for example, 50% of maximum) and controlling the fuel cell accordingly. As a result, battery deterioration can be suppressed.

Figure 13:
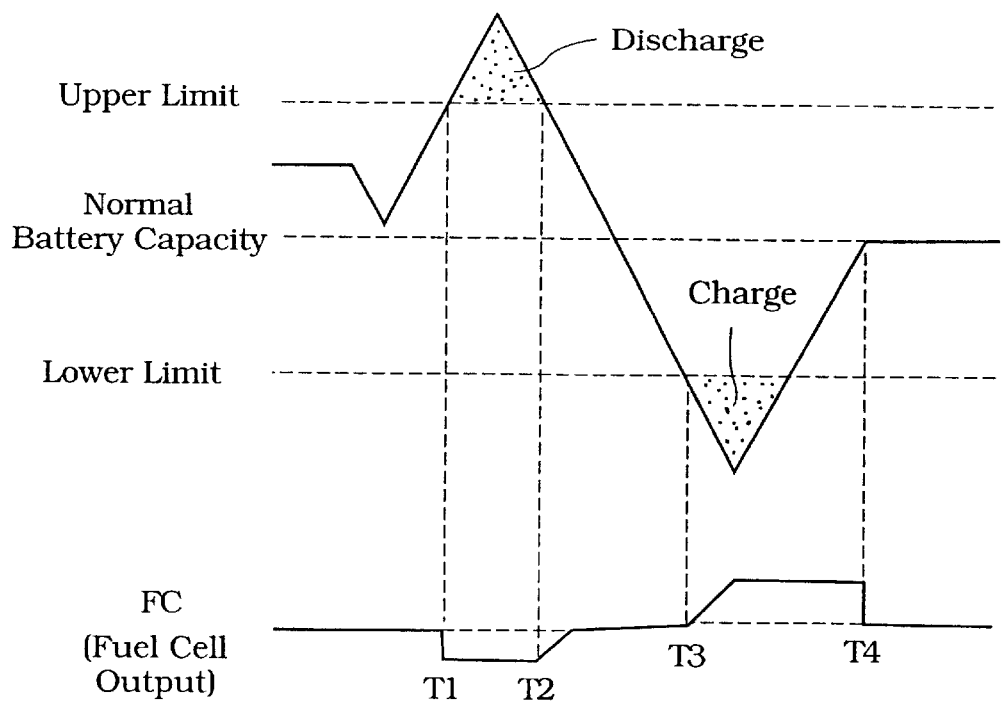
FIG. 13 is a graphical illustration of power source fluctuations resulting from operation of the vehicle in accordance with a method arranged and configured in accordance with certain features, aspects and advantages of the present invention.

With reference now to FIG. 13, a graphical illustration of the effect of the control arrangement of FIG. 11 is illustrated therein. In this arrangement, if the battery capacity is above the upper limit, the output of the fuel cell is reduced (i.e., T1). As a result, the discharge from the battery increases and the capacity is reduced below the upper limit, where in turn the output of the fuel cell is increased again to return to the original value (i.e., T2). In this condition, normal driving is continued. If the battery capacity is reduced below the lower limit, then the output of the fuel cell is increased. This causes the discharge from the battery to stop while charging is performed. Thus, the fuel cell output is increased to supply power to the vehicle and to charge the battery (i.e., T3). Once the battery capacity achieves a preset level, the output of the fuel cell is returned to the original value (i.e., T4).

Figure 14:
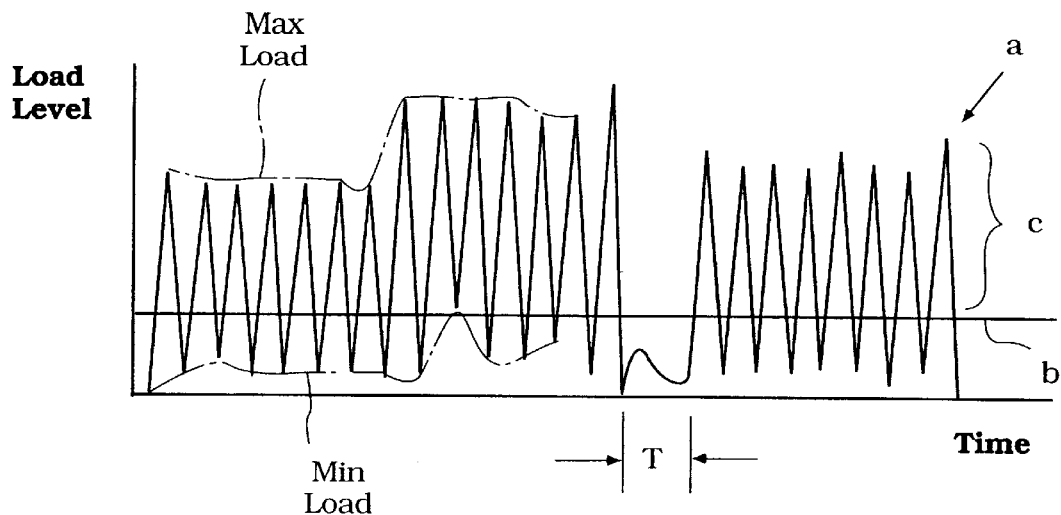
FIG. 14 is a graphical illustration of load change patterns resulting from operation of the vehicle in accordance with another method arranged and configured in accordance with certain features, aspects and advantages of the present invention.

FIG. 14 is a graph showing patterns of load change when the power supply is controlled in accordance with other features, aspects and advantages of the present invention. In this arrangement, the vehicle preferably comprises a power-assisted bicycle having an electric motor. The power-assisted bicycle receives human power (output) acting upon the pedals that is transmitted to a wheel by a power transmission such as a chain. The output of an electric motor is combined with the human power when desired. The combined force of the human and the motor then can be transmitted to a wheel. The output of the electric motor in accordance with this arrangement preferably is obtained by multiplying the pedaling force acting on pedals by a given positive coefficient. Therefore, the output (equal to the load) from with electric motor is substantially correlated with the pedaling force. When being propelled by human power, the maximum pedaling force is limited by the driver's weight and the bottom value (i.e., the minimum pedaling force) in each cycle is approximately zero.

Similar to the example shown in FIG. 10, the fuel cell supplies a substantially constant base load "b" and the battery supplies the variable portion "c" that exceeds the load "b." The base load "b" is preset in each driving mode based at least in part upon the output of the known average load level of a normal motor-assisted bicycle. Preferably, the vehicle controller in this arrangement is capable of learning. In such a configuration, the base load "b" can be set by calculating the average load level from the most previous running data. Thus, the base load "b" can be corrected prior to each operation of the vehicle.

When the vehicle is stopped for a short period due to, for example, traffic signals (time T in the drawing), the fuel cell continues to generate power and is not shut down. Accordingly, the battery is charged during the times that the bicycle is not in motion so long as the sensed battery capacity does not exceed the upper limit. If the sensed battery capacity exceeds the upper limit, then the fuel cell does not operate until the bicycle resumes movement. Because the shut-down is for a very short period of time, a warm-up period is not required and stable output from the fuel cell can easily be reestablished.

If the base load is an envelope curve (i.e., a maximum load line) that is formed by connecting the peaks of each cycle, then the battery remains charged because the battery does not supply any power. If the base load is a median line between the maximum load line and a load line connecting valleys of each cycle, then the battery charge is balanced with the battery discharge. Accordingly, it is desirable to make the base load as even as possible. Practically speaking, the base load likely cannot be made constant; however, the base load preferably is calculated such that the absolute of the differential value is smaller than that of changed load:

$$|db/dt|<|dc/dt|=|da/dt|$$

For example, the base load preferably is set such that the wave has a frequency that is at least higher than that of the varying cycles. With such a configuration, even the fuel cell, which is substantially less responsive to change than the battery, can more efficiently generate power. In the area where the varying cycles are larger than the base load (i.e., "a"), the battery is discharged and in the area where it is smaller (i.e., below "b"), the battery is charged.

In addition, based on the capacity of the battery, the base load "b" can be increased above the median line if the battery capacity is below a preset value. In some arrangements, the base load "b" can be increased to a level even greater than the maximum load line. Similarly, based on the capacity of the battery, the base load "b" can be decreased below the median line if the battery capacity is above the preset value. In some arrangements, the base load can be reduced below the minimum load line. These arrangements allow the battery to be recharged with the vehicle in motion.

Figure 15:
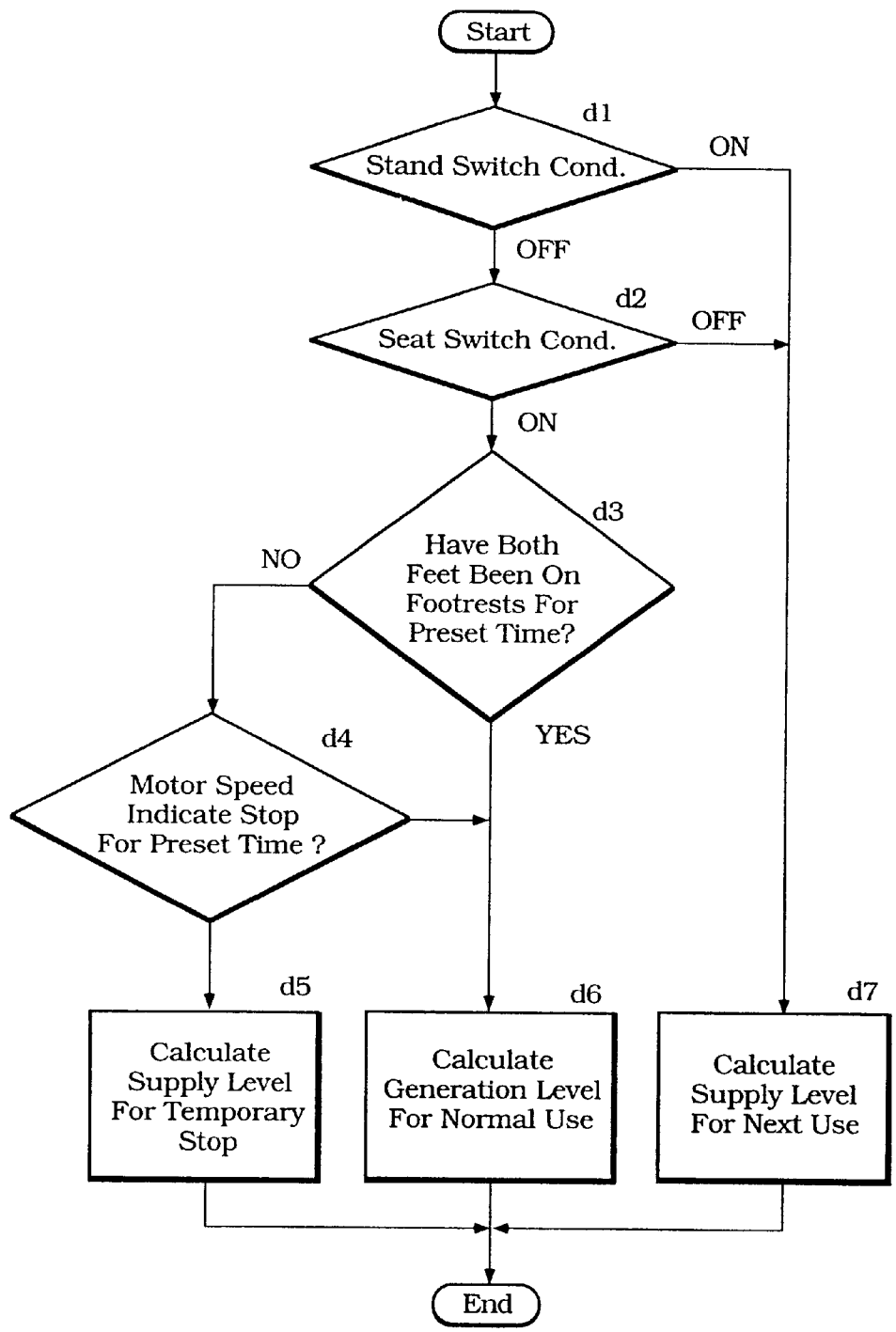
FIG. 15 is a flow chart of a generation control subroutine that can be used to signal temporary stops of the hybrid vehicle and to trigger charging of the battery.

With reference now to FIG. 15, a further subroutine is illustrated that can be used to control power generation during a temporary stop of the vehicle. The subroutine provides a method of charging the batter during the stop. The controller first evaluates whether the vehicle has been stopped. Accordingly, the controller can sense the condition of the stand switch (see D-1) and the condition of the seat switch (see D-2).

If the stand is in use (i.e., ON), then the vehicle is considered to be stopped because the kick stand is deployed. Accordingly, the amount of generation desired is calculated in the stand-by mode for the next operation of the vehicle (see D-7).

If the stand is not in use (i.e., OFF), and if the seat switch indicates that the operator is not seated (i.e., OFF), then the vehicle is considered to be stopped because the operator is not seated. Accordingly, the amount of generation desired is calculated in the stand by mode for the next operation of the vehicle (see D-7).

If the stand is not in use (i.e., OFF) and if the operator is seated (i.e., ON), then the vehicle is considered to be in operation. Accordingly, the controller determines whether or not the operator's right and left feet have been on the right and left footrests for more than specified time period (see D-3). The output of the footrest sensors and the timer are used to make this determination.

If both feet are on the footrest for more than the preset time period, then the vehicle is determined to be moving and the amount of power generation is calculated according to the normal running generation mode (see D-6).

If both feet are not on the footrests for the preset period (i.e., "NO" at D-3), then the speed of the motor is evaluated. In one arrangement, the speed of the motor is determined based on the signal from the encoder.

If the speed of the motor is zero (or not more than another specified speed) for more than a preset period of time (see D-4), then the vehicle is considered stopped. Accordingly, the fuel cell continues to operate to supply energy to the battery such that the battery is recharged to some degree.

If the speed is not less than the specified speed, then the vehicle is considered to be moving with the feet not in the appropriate positions. Accordingly, the amount of generation is calculated according to the normal running generation mode (see D-6).

Figure 16:
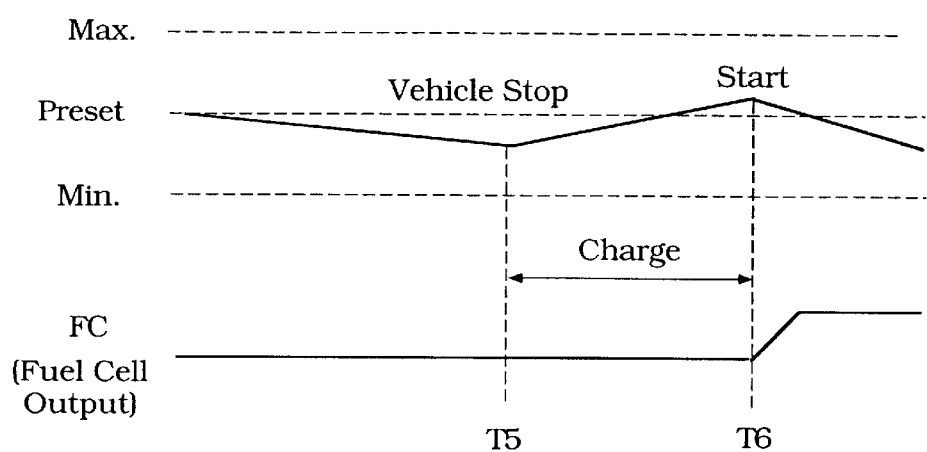
FIG. 16 is a graphical illustration of battery capacity fluctuations during temporary vehicle stops; and, FIG. 17 is a flow chart of another method arranged and configured in accordance with certain features, aspects and advantages of the present invention.

With reference now to FIG. 16, a graphical illustration showing the increase in the battery capacity during a temporary stop of the vehicle when the control subroutine of FIG. 15 is employed. As illustrated, when a temporary stop of the vehicle is detected (i.e., T5), the charging of the battery is begun. During this temporary stop, the battery capacity is gradually increased. When the vehicle is restarted (i.e., at T6), the charging is concluded and the battery capacity will gradually decrease. Also, as illustrated, when operation is begun (i.e., the movement resumes) the fuel cell output preferably is increased to counteract the large and sudden increase in load.

Figure 17:
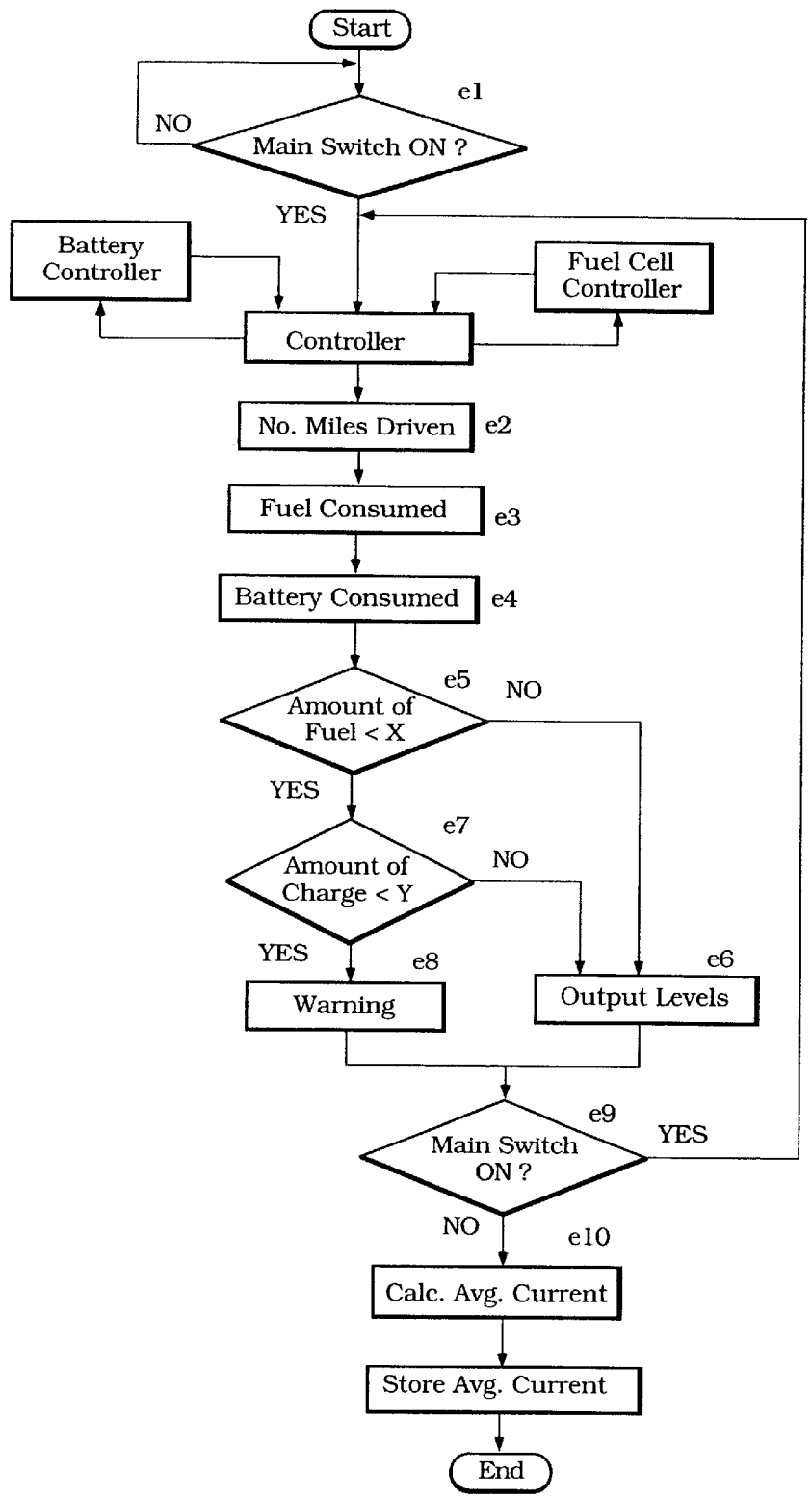

With reference to FIG. 17, a further routine having certain features, aspects and advantages in accordance with the present invention is illustrated therein. In this arrangement, the output of the fuel cell is controlled based on a calculated average of the previous output current experienced during the last operation of the vehicle.

As illustrated, the routine initially determines whether the main switch has been turned on (see E-1). Only after the main switch is placed in an ON-position does the routine continue. After the main switch is turned ON, the vehicle controller 34 transmits and receives a variety of data to or from various components, including the battery controller 94 and the fuel cell controller 102.

Based upon the data received, the controller 34 calculates the number of miles previously driven (see E-2). This number is based upon the number of miles traveled since operation of the vehicle began. The distance preferably is sensed by a distance detection sensor, or odometer, that can be located on the axle is some applications. In some applications, the data is written into a RAM or other memory location. Preferably, the data is written into a RAM of the battery controller 94 or of the fuel cell controller 102.

The controller also calculates the fuel consumption level (see E-3). In some applications, this calculation is based on the quantity of fuel consumed from the start (i.e., the difference between the amount of methanol fuel remaining in the fuel tank at the start and the current amount of methanol fuel remaining in the fuel tank). This calculated fuel consumption level is used to calculate the expected number of miles driven for the fuel cell.

In addition, the controller calculates how much of the battery capacity has been consumed (see E-3). This value can be determined in any suitable manner. In one arrangement, the value is based upon battery capacity reduction data (i.e., the difference between the current battery capacity and the capacity at the start of operation) and upon the number of miles driven. The battery capacity consumption can be used to calculate the number of miles the fuel cell is expected to last.

In other applications, the number of miles expected can be obtained by obtaining data for the capacity consumption of the whole vehicle, including the amount of fuel consumed and the amount of battery consumption and calculating the capacity consumption of the vehicle. For example, if the consumption of the fuel cell is about 100 cc/Ah and the battery capacity consumption is about 2.0 km/Ah, the expected number of miles driven fi the remaining amount of the fuel is about 3,000 cc and the remaining battery capacity is about 5.0 A/h, would be:

$$(3,000/100+5.0) \times 2.0 = 70 \text{ km}$$

The controller then determines whether the amount of fuel remaining in the fuel tank is less than a preset value X (see E-5). If the amount of fuel left is more than X, the remaining amount of fuel is displayed on a suitable display panel (see E-6). On the other hand, if the amount of fuel remaining is less than X, the controller determines whether the remaining capacity of the battery is less than a preset value Y (see E-7). If the remaining battery capacity is more than Y, then the remaining battery capacity is displayed on a suitable display panel (see E-6). Of course, the order of these two operations can be reversed or the two operations can be performed simultaneously.

If the remaining amounts of both the fuel and the battery capacity are less than X and Y respectively, then the operator receives an appropriate warning signal (see E-8). In some applications, the warning signal will be audible, visual or tactile. Preferably, a visual alert is displayed on the display panel (i.e., the read-out 66).

The controller continues to monitor the main switch (see E-9). If the main switch remains in an ON-position, then the routine repeats. If the main switch is turned to an OFF-position, then the average current is calculated (see E-10). In some arrangements, the average current is calculated by reading the data detected by the fuel cell current sensor, which can be stored in the memory of the fuel cell controller 102. The average current can be calculated between the time the main switch is placed in the ON-position and the present time based on the detected data.

The controller then stores the calculated average current in any suitable memory location (see E-11). In the illustrated arrangement, the average current is stored in the nonvolatile memory unit 70. On the basis of the average current, the output of the fuel cell is set when the main switch is subsequently turned ON (for example, the average current becomes one of the initial values and specified base loads, described above)

In this arrangement, as described above, the fuel cell constantly bears a load of a given level as a base load portion while the battery bears a varying load portion that exceeds the base load portion. Therefore, electric power is supplied from the fuel cell at a substantially constant level while electric power is supplied from the battery to account for higher frequency variations that exceed the base load portion. This technique decreases the burden on the battery and prevents or reduces abrupt capacity drops or deterioration of the battery. Additionally, this technique provides more stable running because the entire load is more efficiently distributed between the fuel cell and the battery.

Although the present invention has been described in terms of certain embodiments, other embodiments apparent to those of ordinary skill in the art also are within the scope of this invention. Thus, various changes and modifications may be made without departing from the spirit and scope of the invention. For instance, various components may be repositioned as desired and various operations in the routines can be reordered, combined and subdivided as desired. Moreover, not all of the features, aspects and advantages are necessarily required to practice the present invention. Accordingly, the scope of the present invention is intended to be defined only by the claims that follow.

What is claimed is:

1. A method for controlling an electric vehicle having a first power source and a second power source that each is capable of independently supplying power to an electric motor, the method comprising sensing a load level required to achieve a desired output from the electric motor, calculating a base load portion of said sensed load level with said base load portion being substantially stable, supplying said base load from said first power source and supplying a remainder of said sensed load level from said second power source with said remainder of said sensed load level fluctuating under at least some operating conditions such that said remainder sometimes exceeds said base load and sometimes falls below said base load under at least some operating conditions.

2. The method of claim 1 further comprising said first power source providing power to said power source when said base load portion of said load exceeds said sensed load level.

3. The method of claim 1 further comprising increasing said base load when a sensed power level of said second power source decreases below a first preset value.

4. The method of claim 3 further comprising decreasing said base load when said sensed power level of said second power source increases above a second preset value.

5. The method of claim 1 further comprising decreasing said base load when a sensed power level of said second power source increases above a preset value.

6. The method of claim 1, wherein calculating said base load comprises calculating an average load for a previous operation of the electric vehicle.

7. The method of claim 1, wherein calculating said base load comprises evaluating a maximum load and a minimum load and positioning said base load between said maximum load and said minimum load.

8. The method of claim 7, wherein said positioning said base load comprises calculating a median of said maximum load and said minimum load.

9. The method of claim 8 further comprising adjusting said base load in response to changes in a sensed power level of said second power source.

10. The method of claim 7, wherein said positioning said base load comprises accounting for changes in a sensed power level of said second power source.

11. The method of claim 1 further comprising detecting a vehicle stop and continuing to supply power from said first power supply while ceasing to supply power from said second power supply.

12. The method of claim 11 further comprising detecting a vehicle restart and increasing an amount of power supplied from said first power supply when said vehicle restart has been detected.

13. The method of claim 11, wherein detecting said vehicle stop comprises sensing a position of a stand.

14. The method of claim 11, wherein detecting said vehicle stop comprises sensing a position of a foot of an operator.

15. The method of claim 11, wherein detecting said vehicle stop comprises sensing whether an operator is positioned on a seat.

16. The method of claim 1, wherein said base load is substantially constant.

17. The method of claim 1, wherein said remainder is variable.

18. An electric vehicle comprising a frame, at least one driven wheel rotatably connected to said frame, a motor unit supported by said frame and drivingly connected to said at least one driven wheel, a control unit communicating with said motor unit, power being separately supplied to said motor unit from a first power source and a second power source, said control unit being adapted to sense a varying load demand, said control unit being adapted to calculate a base load portion of said varying load demand, said base load portion being substantially stable and being supplied by said first power source, said control unit being adapted to demand a compensating load from said second power source, said compensating load compensating for differences between said base load and said varying load with power supplied by said second power source such that said compensating load can vary with said varying load demand.

19. The vehicle of claim 18, wherein said first power source comprises a fuel cell unit.

20. The vehicle of claim 19, wherein said second power source comprises a battery unit.

21. The vehicle of claim 18, wherein said first power source and said second power source are connected by a first circuit and a relay is positioned along said first circuit between said first power source and said second power source.

22. The vehicle of claim 21, wherein said first power source can supply power to said second power source through, at least in part, said first circuit such that said first power source can be used to recharge said second power source.

23. The vehicle of claim 21 further comprising a one-way current component positioned along said first circuit between said first power source and said second power source.

24. The vehicle of claim 23, wherein said one-way current component is interposed between said first power source and said relay.

25. The vehicle of claim 18 further comprising a power regulator disposed along said first circuit.

26. The vehicle of claim 18 further comprising a controller that is in electrical communication with said relay and that is adapted to turn said relay on and off.

27. A power source control method for a hybrid electric vehicle, the vehicle having a fuel cell and a battery, the fuel cell and the battery each being electrically connected to an electric motor, the electric motor powering the vehicle, the method comprising sensing a varying load on the electric motor, dividing the varying load into a substantially constant base load portion and a varying supplemental load portion, the base load portion being supplied to said electric motor from said fuel cell and the supplemental load portion being supplied to said electric motor from said battery under at least some operating conditions.

28. The method of claim 27 further comprising sensing a battery capacity and increasing said base load when said battery capacity is lower than a first preset level and decreasing said base load when said battery capacity is above a second preset level.

29. The method of claim 27 further comprising maintaining fuel cell operation after the vehicle stops and supplying at least a portion of said base load from said fuel cell to said battery for charging.

* * * * *